(12) United States Patent
Ishida et al.

(10) Patent No.: US 7,948,387 B2
(45) Date of Patent: May 24, 2011

(54) DROWSINESS DETERMINATION APPARATUS, PROGRAM, AND METHOD

(75) Inventors: Kenji Ishida, Nagoya (JP); Kahori Uchiyama, Nisshin (JP)

(73) Assignee: Denso Corporation, Kariya (JP)

( * ) Notice: Subject to any disclaimer, the term of this patent is extended or adjusted under 35 U.S.C. 154(b) by 604 days.

(21) Appl. No.: 12/073,075

(22) Filed: Feb. 29, 2008

(65) Prior Publication Data

US 2008/0218359 A1 Sep. 11, 2008

(30) Foreign Application Priority Data

Mar. 8, 2007 (JP) .................... 2007-058980

(51) Int. Cl.
*G08B 23/00* (2006.01)
(52) U.S. Cl. ......................... 340/575; 382/118
(58) Field of Classification Search .......... 340/575, 340/573.1, 540, 500
See application file for complete search history.

(56) References Cited

U.S. PATENT DOCUMENTS 5,878,156 A * 3/1999 Okumura .............. 382/118
2008/0071177 A1 3/2008 Yanagidaira et al.

FOREIGN PATENT DOCUMENTS

| JP | 07-181012 A | 7/1995 |
| JP | 09-044685 A | 2/1997 |
| JP | 09-270010 A | 10/1997 |
| JP | A-2008-212298 | 9/2008 |

OTHER PUBLICATIONS

Office Action dated Oct. 7, 2008 in corresponding Japanese patent application No. 2007-058980 (and English translation).

* cited by examiner

*Primary Examiner* — Brian A Zimmerman
*Assistant Examiner* — Sara Samson
(74) *Attorney, Agent, or Firm* — Posz Law Group, PLC

(57) ABSTRACT

An apparatus for accurately determining a drowsiness level is provided. A doze prevention system includes a photographic apparatus, a drowsiness determination apparatus, and other apparatuses for doze prevention such as an alarm apparatus, a neck air conditioning apparatus, a seat belt vibrating apparatus, and a brake control apparatus. The photographic apparatus captures a facial image of a driver of a vehicle. The drowsiness determination apparatus determines a drowsiness level based on the facial image. The drowsiness determination apparatus uses a facial image captured by the photographic apparatus, detects a sign of drowsiness or a sign of struggle, and determines the drowsiness level based on the detection results.

6 Claims, 16 Drawing Sheets

ELECTROCARDIOGRAPHIC WAVEFORM

HEART RATE VARIABILITY (HRV):
A PHENOMENON IN WHICH A HEART RATE
FREQUENCY VARIES.

DROWSINESS DETERMINATION APPARATUS, PROGRAM, AND METHOD

CROSS REFERENCE TO RELATED APPLICATIONS

The present application is based on and claims priority to unpublished Japanese Patent Application No. JP 2007-058980 filed on Mar. 8, 2007, the entire contents of which are incorporated herein by reference.

BACKGROUND OF THE INVENTION

1. Field of the Invention

The present invention relates to a drowsiness determination apparatus, program, and method for determining a subject's drowsiness level.

2. Description of Related Art

In order to prevent a vehicle driver from dozing at the wheel, an apparatus has been proposed that captures a facial image of a subject, such as the driver, using a camera mounted in the vehicle. The captured image is processed to progressively determine a drowsiness level, for example, in a stepwise fashion.

Such an apparatus generally calculates a degree of eye opening of the subject from the captured image and determines a dozing state of the subject based on the calculation.

For example, a technology proposed in JP-1997-44685 A detects positions of an eyebrow and an eye and determines the degree of eye opening based on a relative distance between the eyebrow and the eye. The technology makes the determination based on an assumption that an increase in the relative distance between the eyebrow and the eye, such as an open portion of the eye or an upper eyelid indicates a decrease in the eye opening degree. The technology determines that the drowsiness level increases as the eye opening degree decreases.

When the above-mentioned technology gradually determines drowsiness levels based on eye opening degrees, it is necessary to settle multiple threshold values for the eye opening degrees and determine to which ranges separated by the threshold values the eye opening degrees correspond. However, there are differences among individuals in eye opening degrees and ways of closing eyes as the drowsiness increases. Settling a unique threshold value is therefore relatively difficult.

Further, individual actions of a subject may affect accuracy of such a method. For example, when drowsiness is realized, the subject may resist the drowsiness by deliberately raising the eyebrows so as to open the eyes wide. Further, differences in individual behavior and basic physical makeup result in variation in the relative distance between the eyebrow and the eye.

When the eyebrow is raised higher than, for example, a position associated with a normal state, the relative distance between the eyebrow and the eye becomes greater. As a result, the eyebrow-to-eye measurement becomes greater than the eyebrow-to-eye measurement associated with a decrease of the eye opening degree when the eyebrow is in the normal position. Accordingly, the drowsiness level is assumed to be higher than it is. Still further, when the drowsiness increases even further, the eyebrow lowers and thus, the relative distance between the eyebrow and the eye decreases, which would normally indicate a greater degree of eye opening even though the net eye opening degree may decrease. In such a case, the drowsiness level is assumed to be lower than it actually is.

For the above noted reason, it has previously been difficult to accurately determine the drowsiness level for the technology based only on the eye opening degree.

SUMMARY OF THE INVENTION

The present invention has been made in consideration of the foregoing. It is therefore an object of the invention to provide a drowsiness determination apparatus, program, and method capable of highly accurately determining a drowsiness level.

To solve the above-mentioned problem, a drowsiness determination apparatus uses a decreased wakefulness detection means and a struggle detection means to detect a sign of decreased wakefulness due to drowsiness and a sign of struggle against drowsiness. Based on detection results, a drowsiness determination means determines a drowsiness level. Specifically, the drowsiness determination means determines no drowsiness when the sign of decreased wakefulness is not detected. The drowsiness determination means determines drowsiness when the sign of struggle is detected and can determine a drowsiness level according to presence or absence of the sign of struggle in a state determined to be drowsy.

The drowsiness determination apparatus according to the above construction can detect the sign of decreased wakefulness to determine the presence or absence of a subject's drowsiness and determine intensity of a drowsiness level in accordance with a combination of results of detecting the sign of decreased wakefulness and the sign of struggle.

In some cases a drowsiness level may be determined by dividing the drowsiness level into multiple ranks based only on a result of detecting a sign of the decreased wakefulness. In such case, a level of the sign of the decreased wakefulness as a detection result needs to be subdivided into smaller ranks based on multiple threshold values according to the number of targeted ranks. However, there are differences among individuals in errors of detecting a sign of the decreased wakefulness or in levels of showing that sign as the drowsiness increases. As the number of ranks increases, accurately classifying the above-mentioned detection result becomes difficult and the detection result is less accurately classified.

When the drowsiness level is determined not only by the sign of decreased wakefulness but also by a combination of the sign detection results, each of the sign detection results need not be subdivided into the number of targeted ranks. Decreasing the number of ranks to be classified for the detection results makes it possible to easily and accurately classify the respective detection results. Consequently, combining the detection results can result in a highly accurately determination of a drowsiness level.

The sign of decreased wakefulness can be detected based on an eye opening degree and a sign of struggle can be detected based on a distance between eyebrow and eye and the drowsiness determination apparatus can accordingly detect drowsiness according to the above-mentioned construction.

As noted, the eye opening degree gradually decreases as the drowsiness level increases. The distance between eyebrow and eye increases when the drowsiness level exceeds a specified threshold value. Accordingly, the drowsiness can be determined when the eye opening degree becomes smaller than the specified threshold value, such as when a sign of decreased wakefulness is detected. An increased drowsiness level corresponding to increased drowsiness can be determined when the distance between eyebrow and eye increases, such as when the sign of struggle is detected.

The drowsiness determination apparatus according to the above-mentioned construction can determine at least three drowsiness levels including no drowsiness, weak drowsiness, and strong drowsiness.

When another drowsiness level is added to determine a drowsiness level, it may be preferable, in connection with an exemplary drowsiness determination apparatus, to provide a condition A where an eye opening degree is less than or equal to a first threshold value; condition B where an eye opening degree is less than or equal to a second threshold value smaller than the first threshold value; and condition C where a distance between eyebrow and eye is greater than a specified threshold value. The drowsiness determination apparatus determines a drowsiness level based on these conditions.

Specifically, the drowsiness determination means determines a drowsiness level as strong drowsiness when the condition B is satisfied. The drowsiness determination means determines a drowsiness level as medium drowsiness whose drowsiness level is lower than the strong drowsiness when the condition A and the condition C are satisfied and the condition B is not satisfied. The drowsiness determination means determines a drowsiness level as weak drowsiness whose drowsiness level is lower than the medium drowsiness when the condition A is satisfied and neither the condition B nor the condition C is satisfied. The drowsiness determination means determines a drowsiness level as no drowsiness when neither the condition A nor the condition B is satisfied.

It is desirable to configure the above-mentioned first and second threshold values as follows. The first threshold value is configured so that a drowsiness level lower than that for satisfying the condition C satisfies the condition A. The second threshold value is configured so that a drowsiness level higher than that for satisfying the condition C satisfies the condition B.

When the first and second threshold values are configured in such a manner, an occurrence of drowsiness first satisfies only the condition A and is assumed to be weak drowsiness. The drowsiness, when increased thereafter, satisfies the condition C and is assumed to be medium drowsiness. The drowsiness, when increased further, satisfies the condition B and is assumed to be strong drowsiness.

The drowsiness determination apparatus can determine a further increased drowsiness level in comparison with the first described construction. The drowsiness determination apparatus can determine drowsiness levels in four ranks, such as strong, medium, weak, and no drowsiness. It should be noted that with the addition of another drowsiness level to determine a drowsiness level, when the eye opening degree is less than or equal to the third threshold value smaller than the second threshold value, the drowsiness determination apparatus according to such a construction determines the drowsiness level to be stronger than the strong drowsiness independently of the other conditions.

In accordance with various exemplary embodiments, drowsiness level determined to be strong drowsiness in two ranks. Further, the drowsiness determination apparatus can determine a drowsiness level in a total of five ranks.

It should be noted that notwithstanding the above described embodiments, the invention is not limited to specific methods of acquiring an eye opening degree and a distance between eyebrow and eye.

For example, an electrode may be attached to a face to detect feeble electricity generated in proportion to a force of moved facial muscles and accordingly acquire eyelid and eyebrow movements. Based on the detected movements, the eye opening degree and the distance between eyebrow and eye can be acquired.

In addition to the above-mentioned methods, there may be a method of acquiring the eye opening degree and the distance between eyebrow and eye based on the facial image of a subject. The drowsiness determination apparatus according to such a construction uses facial image data to detect position information of features indicative of eye and eyebrow positions in the facial image data. The drowsiness determination apparatus then uses the position information to specify the eye opening degree and the distance between eyebrow and eye.

Such drowsiness determination apparatus can determine a drowsiness level based on the facial image data captured by the capturing means. The drowsiness determination apparatus can easily determine the drowsiness level of a subject without directly providing the subject with the electrode for detecting eyelid and eyebrow movements.

The drowsiness determination apparatus detects position information indicating positions of the eye and the eyebrow in facial image data based on the facial image data captured by the capturing means.

Such drowsiness determination apparatus can be mounted on a vehicle and can determine drowsiness levels of occupants including a vehicle driver. Further, an apparatus that performs operations for preventing the driver from dozing in accordance with a result of determining the drowsiness level can be mounted on the vehicle. The drowsiness determination apparatus can coordinate with that apparatus to prevent the driver from dozing. For example, the drowsiness determination apparatus may coordinate with a car navigation system to provide screen displays and audio outputs in accordance with determination results of drowsiness levels. In accordance with determination results of drowsiness levels, it may be preferable to operate an apparatus for sending air to the driver, vibrating a seat belt, or controlling a brake.

Specifically, the drowsiness determination apparatus may otherwise detect the sign of decreased wakefulness and the sign of struggle. The sign of decreased wakefulness, for example, may be detected based on a parasympathetic nerve activity and the sign of struggle based on a sympathetic nerve activity. With regard to the autonomous nervous system, a sympathetic nerve is one that is active when a subject is awake or tense. A parasympathetic nerve is active when one sleeps or relaxes. When drowsiness increases, the parasympathetic system becomes more active. When one struggles against drowsiness, the sympathetic system becomes more active.

The drowsiness determination apparatus as constructed above can determine a drowsiness level by detecting activities of the parasympathetic nerve and the sympathetic nerve.

The invention is not limited to specific methods of detecting the parasympathetic nerve and the sympathetic nerve. For example, the drowsiness determination apparatus can use an electrocardiographic waveform acquisition means to acquire an electrocardiographic waveform. Based on the electrocardiographic waveform, the drowsiness determination apparatus may detect activities of the parasympathetic nerve and the sympathetic nerve.

The drowsiness determination apparatus according to such a construction can detect activities of the parasympathetic nerve and the sympathetic nerve from the acquired electrocardiographic waveforms. The drowsiness determination apparatus can determine a drowsiness level based on the detection result. The drowsiness determination apparatus may be mounted on a vehicle and thereby can determine a drowsiness level of the driver of the vehicle.

In other embodiments, a program such as can be provided on a computer readable medium, which when read and executed, allows a computer system to perform processes functioning, for example, as the decreased wakefulness detection means, the struggle detection means, and the drowsiness determination means. A computer system under control of such a program can constitute part of the drowsiness determination apparatus.

It should be noted that the above-mentioned program can include instructions, such as a sequence of numbered instructions appropriate to processes associated with operation of the computer system. The program can be supplied directly to the drowsiness determination apparatus or to a user thereof through a computer readable medium, such as various recording media or communication lines.

In accordance with an exemplary drowsiness determination method, a sign of decreased wakefulness due to drowsiness and a sign of struggle against drowsiness can be detected and a drowsiness level determined by combining detection results. A determination of no drowsiness can be made when the sign of decreased wakefulness is not detected. A determination of drowsiness can be made when the sign of struggle is detected. A determination of a drowsiness level can be made according to the presence or absence of the sign of struggle in a state where the subject is determined to be drowsy.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF EXEMPLARY EMBODIMENTS

First Embodiment

Figure 1:
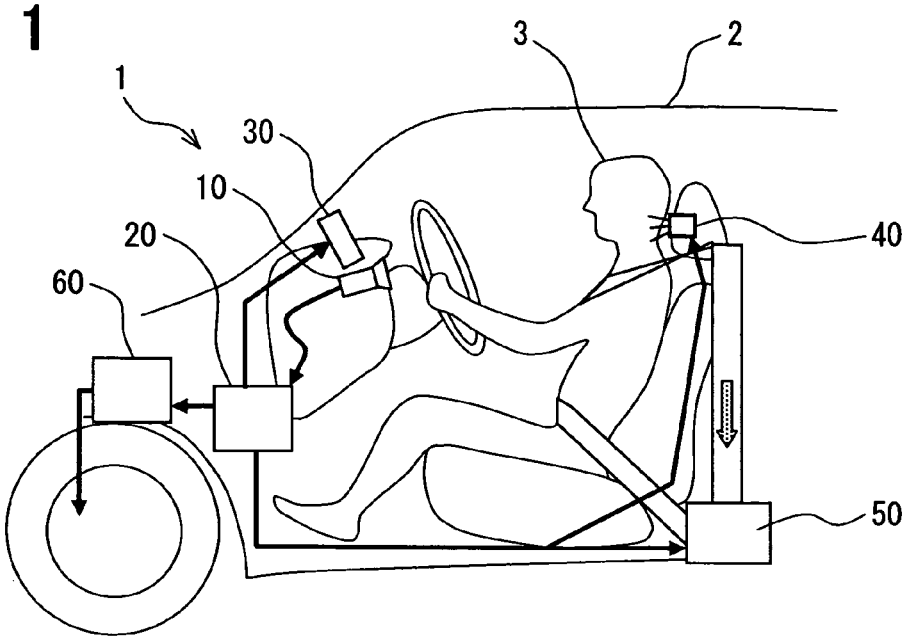
FIG. 1 is a diagram illustrating a side view of an exemplary doze prevention system according to a first embodiment.

A doze prevention system 1 according to a first embodiment is mounted on a vehicle 2. As shown in FIG. 1, the doze prevention system 1 includes a photographic apparatus 10, a drowsiness determination apparatus 20, and other apparatuses. The photographic apparatus 10 is positioned so as to face the driver 3 in front of the driver 3 in the vehicle 2 and is constructed to capture a front facial image of the driver 3. The drowsiness determination apparatus 20 determines a drowsiness level based on the captured facial image. The other apparatuses include an alarm apparatus 30, a neck air conditioning apparatus 40, a seat belt vibrating apparatus 50, and a brake control apparatus 60 that perform operations in accordance with determined drowsiness levels for attempting to bring an end a detected drowsy driving incident and restore the driver 3 to wakefulness.

Figure 2:
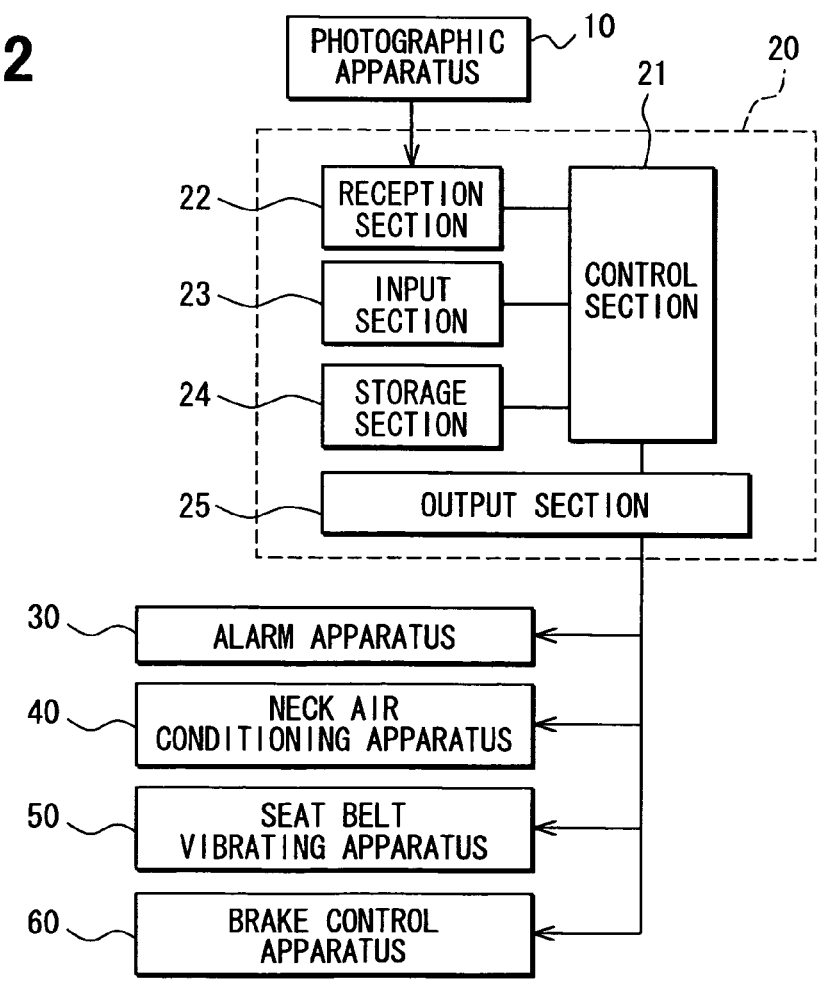
FIG. 2 is a block diagram illustrating an exemplary drowsiness determination apparatus.

As shown in FIG. 2, the drowsiness determination apparatus 20 includes a control section 21, a reception section 22, an input section 23, a storage section 24, and an output section 25. The control section 21 of the drowsiness determination apparatus 20 controls the entire drowsiness determination apparatus 20 in accordance with a program stored in the storage section 24.

Image data indicates a facial image captured by the photographic apparatus 10 and can be referred to herein as facial image data. The control section 21 receives the facial image data from the reception section 22 and stores the facial image data in internal memory, which can be referred to as built-in memory, in real time. Based on the facial image data, the control section 21 thereafter performs a wakefulness data collection process, a doze prevention alarm process, a position information detection process, a state specification process, and a drowsiness stage determination process to be described in greater detail hereinafter. During the drowsiness stage determination process, the control section 21 determines a drowsiness level based on five stages such as stage 1 through stage 5. Stage 1 indicates the lowest drowsiness level and stage 5 the highest.

The input section 23 includes a start button and a stop button. The start button starts the wakefulness data collection process to be described in greater detail hereinafter. The stop button terminates all processes and operations of the doze prevention system 1.

The storage section 24 includes areas for storing data such as a program for controlling the control section 21 and various data to be described in greater detail hereinafter. Based on the drowsiness level determined by the control section 21, the output section 25 allows the alarm apparatus 30, the neck air conditioning apparatus 40, the seat belt vibrating apparatus 50, and the brake control apparatus 60 to perform doze preventing operations also to be described in greater detail hereinafter.

The alarm apparatus 30 has a display and a speaker and can warn the driver 3 against the drowsy driving by outputting the warning information to the display and audibly outputting a warning to the speaker, such as a warning associated with the content of the display. For example, the warning information can include a message such as "Take a rest as soon as possible" at stage 2, "Attention" at stage 3 or 4, and "Stop driving" at stage 5. The neck air conditioning apparatus 40 is provided, for example, in a head rest of the seat for the driver 3 to send air to the neck of the driver 3 when the control section 21 determines any of stages 2 through 5. The seat belt vibrating apparatus 50 is provided to function as a take-up mechanism for a seat belt and vibrates the seat belt when the control section 21 determines any of stages 3 through 5. The brake control apparatus 60 automatically operates a brake to forcibly stop or gradually decelerate the vehicle when the control section 21 determines stage 4 or 5.

Figure 3:
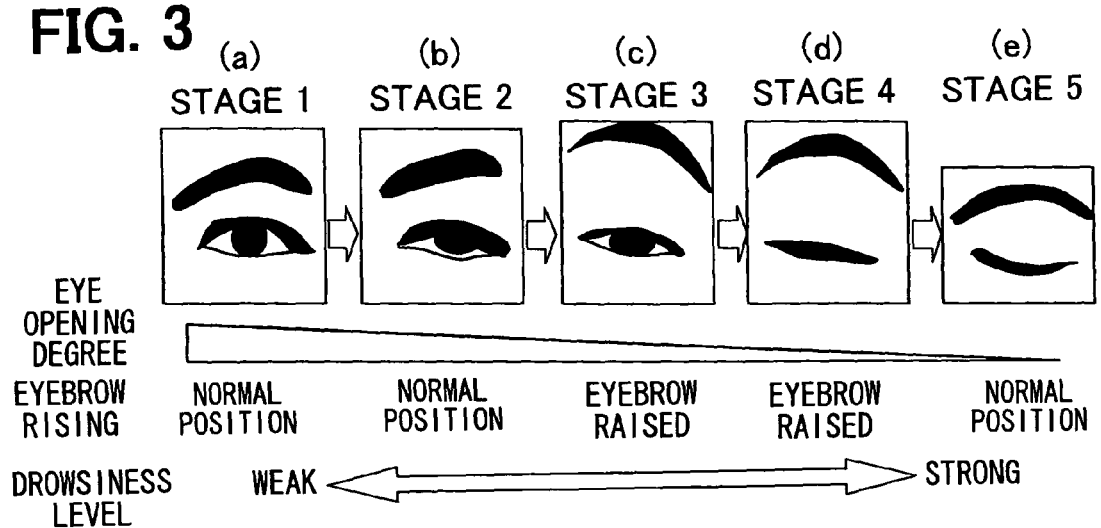
FIG. 3 is a diagram illustrating various stages in drowsiness determination according to a first embodiment.

A principle of determining drowsiness levels according to the present embodiment can be understood with reference to FIG. 3 in which items (a) through (e) show eye states corresponding to stages 1 through 5, respectively. When a subject begins to feel sleepy and a level of wakefulness decreases, the eye of the subject begins to close slightly as shown at stage 2 compared to the degree of eye opening in a fully wakeful state shown at stage 1 in FIG. 3.

In stage 2, the subject may be aware of the hazard of falling asleep while driving a vehicle, for example. When the drowsiness further increases, the subject struggles against a decrease in wakefulness and raises the eyebrow to open the eye as shown in stage 3 of FIG. 3. When the drowsiness increases further, the eye closes as shown at stage 4 of FIG. 3 and, finally, closes completely at stage 5 shown in FIG. 3.

Figure 7A:
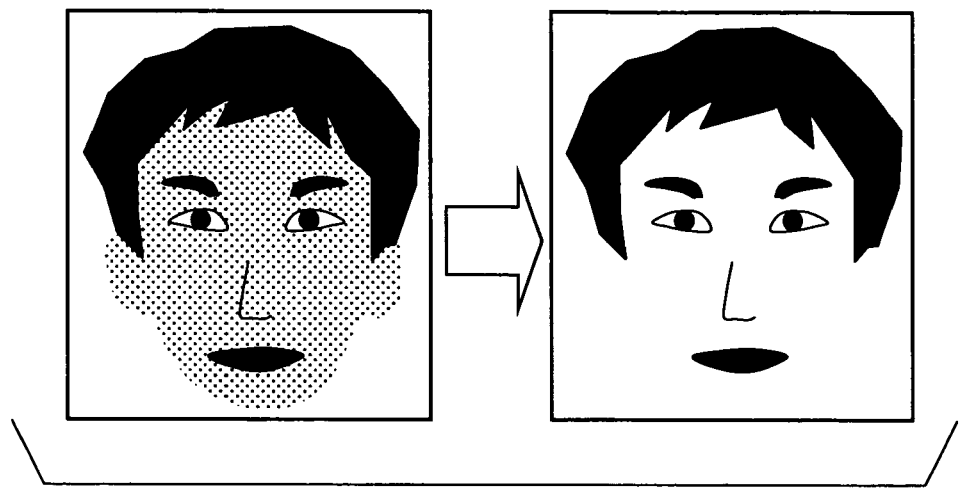
FIG. 7A is a diagram illustrating exemplary position information detection.
Figure 7B:
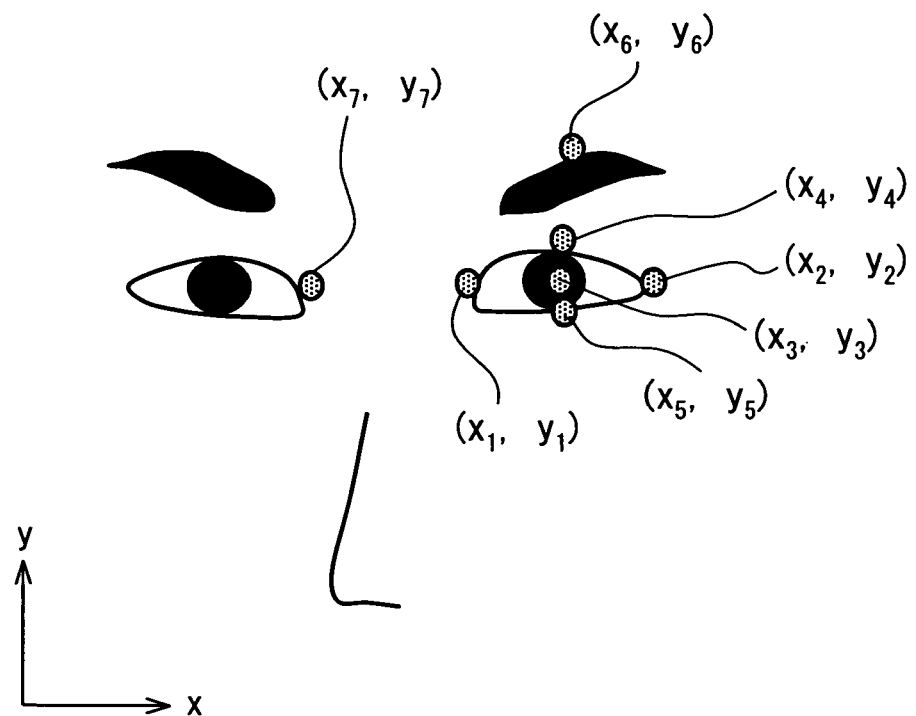
FIG. 7B is a diagram further illustrating exemplary position information detection.

The present embodiment measures an eye opening degree, which can be defined as a value based on the distance between $(x_4, y_4)$ and $(x_5, y_5)$ as shown in FIG. 7B, and a distance between the eyebrow and the eye, which can be defined as a value based on the distance between $(x_3, y_3)$ and $(x_6, y_6)$ as shown in FIG. 7B. The embodiment combines measurement results with each other to determine a drowsiness level.

Figure 4:
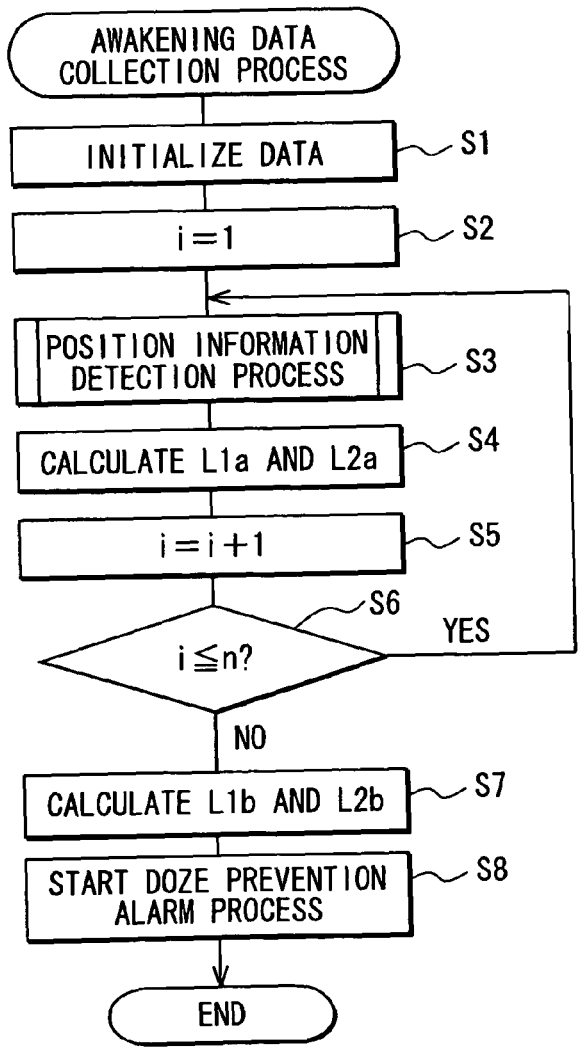
FIG. 4 is a flowchart illustrating an exemplary wakefulness data collection process.

Various processes can be performed by the drowsiness determination apparatus 20 of the doze prevention system 1 according to the first embodiment. For example, with reference to FIG. 4, a wakefulness data collection process can be performed by the control section 21. When the start button of the input section 23 is pressed, the wakefulness data collection process starts and acquires an eye opening degree and a distance between the eyebrow and the eye in the wakefulness state.

When starting the wakefulness data collection process, the control section 21 first initializes data at S1. The control section 21 deletes image data stored in its built-in memory and various data stored in the storage section 24. The control section 21 sets variable i to 1 at S2. The control section 21 then performs a position information detection process for detecting position information about the eye and the eyebrow of the driver 3 at S3. Based on the facial image data indicating the facial image captured by the photographic apparatus 10, the control section 21 calculates opening degree information L1 and rising eyebrow information L2 for a specified count, such as a count of m. The degree information L1 indicates the eye opening degree. The rising eyebrow information L2 indicates a rising eyebrow level. The control section 21 stores the m counts of L1 and L2 in the storage section 24.

The L1 value is based on a distance between upper and lower eyelids in the facial image and decreases as the drowsiness increases. The L2 value is based on a distance between the center of outer and inner corners of the eye and an upper end of the left eyebrow, and can be referred to more simply as the distance between the eyebrow and the eye. When a subject feels sleepy to a particular degree or higher, the drowsiness is resisted or struggled against and the subject tries to keep the eye wide open, thus increasing the L2 value. The position information detection process will be described in greater detail hereinafter.

The control section 21 calculates representative values L1a and L2a at S4 based on the m number of L1 and L2 values calculated at S3 and stored in the storage section 24. The control section 21 calculates and sets L1a to a value that is 5% greater than the value associated with the minimum cumulative relative frequency based on a frequency distribution of all the L1 values. Similarly, the control section 21 calculates and sets L2a to a value that is 5% smaller than the value associated with the maximum cumulative relative frequency based on a frequency distribution of all the L1 values.

The control section 21 stores the calculated L1a and L2a values in the storage section 24 and deletes the L1 and L2 values stored in the storage section 24. The storage section 24 can store the multiple L1a and L2a values. Each time the L1a and L2a values are calculated at S4, the number of these values stored in the storage section 24 is incremented by one.

The control section 21 then increments variable i at S5 corresponding to i=i+1. When variable i is less than or equal to specified value n, corresponding to YES at S6, the process returns to S3. When variable i is not less than or equal to specified value n, corresponding to NO at S6, the process proceeds to S7 where the storage section 24 stores n number of the L1a and L2a values. The control section 21 calculates L1b and L2b at S7, which are used for the state specification process to be described greater detail hereinafter.

The control section 21 reads all the n L1a and L2a values stored in the storage section 24 at S4. Let us assume an average value to be $\mu$ and a standard deviation to be $\sigma$ in a normal distribution made of all the L1a values. The control section 21 calculates a value equivalent to $\mu-2\sigma$ as L1b. Similarly, the control section 21 calculates a value equivalent to $\mu+2\sigma$ as L2b in a normal distribution made of all the L2a values. The control section 21 stores the calculated L1b and L2b values in the storage section 24 and deletes the L1a and L2a values stored in the storage section 24. The control section 21 starts a doze prevention alarm process at S8 and terminates the wakefulness data collection process.

Figure 5:
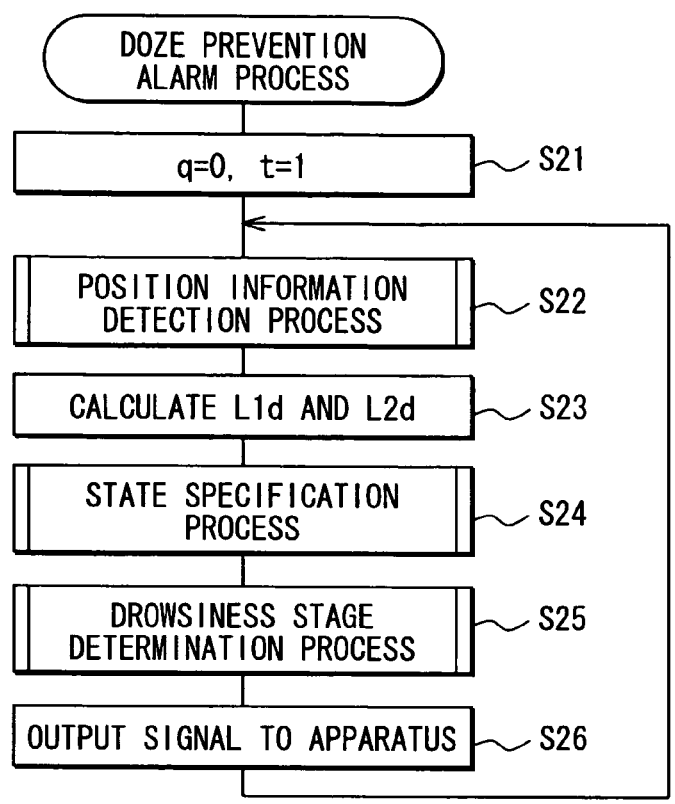
FIG. 5 is a flowchart illustrating an exemplary doze prevention alarm process.

With reference to FIG. 5, The doze prevention alarm process starts to set variable q to 0 and variable t to 1 at S21. The control section 21 performs the position information detection process for detecting position information about the eye and the eyebrow of the driver 3 at S22 as described herein above. The control section 21 calculates m L1 and L2 values and stores the calculated L1 and L2 values in the storage section 24. The position information detection process will be described in greater detail hereinafter. The control section 21 calculates representative values L1d and L2d at S23 based on the L1 and L2 values calculated at S22. The control section 21 reads all the m L1 and L2 values stored in the storage section 24. The control section 21 calculates and sets L1d as 5% greater than the value associated with the minimum cumulative relative frequency based on a frequency distribution of all the L1 values. Similarly, the control section 21 calculates and sets L2d as 5% smaller than the value associated with the maximum cumulative relative frequency based on a frequency distribution of all the L1 values. The control section 21 stores the calculated L1d and L2d values in the storage section 24 and deletes the L1 and L2 values stored in the storage section 24. The control section 21 then performs the state specification process at S24 for specifying states of an eye and eyebrow of the driver 3.

The control section 21 determines changes in the eye opening degree and the distance between the eyebrow and the eye based on L1$d$ and L2$d$ calculated at S23, L1$b$ and L2$b$ calculated at S7 of the wakefulness data collection process, and L1$rb$ calculated in a drowsiness stage determination process to be described in greater detail hereinafter. The L1$rb$ value is used only after calculated by the drowsiness stage determination process. The state specification process will be described in greater detail hereinafter. The control section 21 then performs the drowsiness stage determination process for determining the drowsiness level of the driver 3 at S25. The control section 21 determines the drowsiness level in terms of stages 1 through 5 based on the eye and eyebrow states specified at S24. The drowsiness level is lowest at stage 1 and highest at stage 5. The drowsiness stage determination process will be described in greater detail hereinafter.

The control section 21 allows the output section 25 to output signals for operating the alarm apparatus 30, the neck air conditioning apparatus 40, the seat belt vibrating apparatus 50, and the brake control apparatus 60 at S26 based on the drowsiness level determined at S25. When the drowsiness level is determined to be stage 1 at S25, the control section 21 disallows the above-mentioned apparatuses to operate. When the drowsiness level is determined to be stage 2, the control section 21 enables the alarm apparatus 30 and the neck air conditioning apparatus 40 to operate. When the drowsiness level is determined to be stage 3, the control section 21 enables the alarm apparatus 30, the neck air conditioning apparatus 40, and the seat belt vibrating apparatus 50 to operate. When the drowsiness level is determined to be stage 4 or 5, the control section 21 enables all of the apparatuses to operate. After S26, the process returns to S22. It should be noted that the doze prevention alarm process continues until the stop button of the input section 23 is pressed or a power output section such as an engine of the vehicle 2 stops and control over the entire vehicle terminates.

Figure 6:
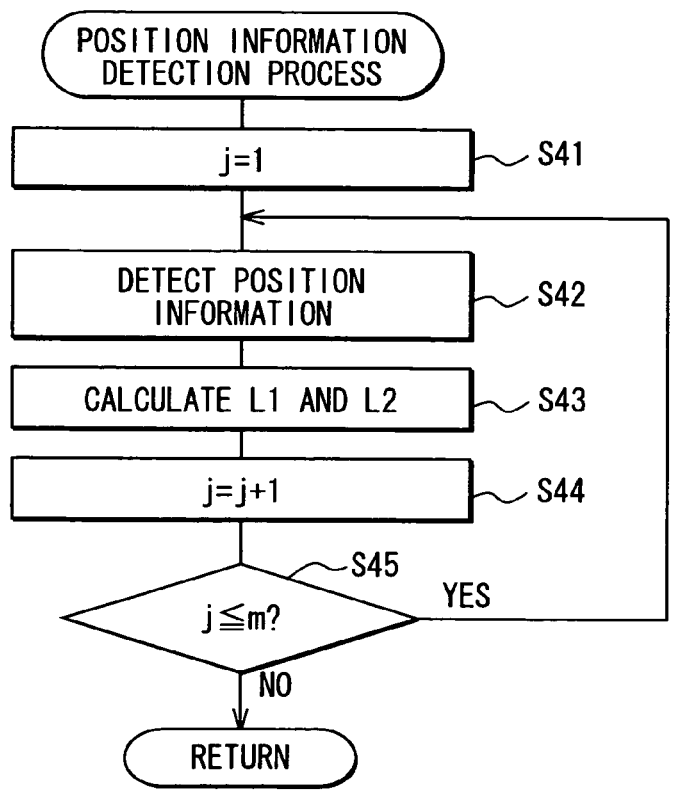
FIG. 6 is a flowchart illustrating an exemplary position information detection process

With reference to FIG. 6, while in the position information detection process, the control section 21 first sets variable j to 1 at S41. The control section 21 then detects position information based on the facial image data indicating the facial image captured by the photographic apparatus 10 at S42. The position information indicates positions of the eye and the eyebrow in facial image data. The control section 21 allows the photographic apparatus 10 to capture the facial image of the driver 3. Based on the facial image data indicating the facial image, the control section 21 performs a binarization process for separating the facial image data into black and white portions as shown in FIG. 7A. Specifically, the technology disclosed in JP-B No. 220633/1991, for example, can be used for such separation.

As shown in FIG. 7B, the control section 21 detects positions of various features such as an inner corner of the left eye $(x_1, y_1)$, an outer corner of the left eye $(x_2, y_2)$, an upper end of the left upper eyelid $(x_4, y_4)$, a lower end of the left lower eyelid $(x_5, y_5)$, an upper end of the left eyebrow $(x_6, y_6)$, an inner corner of the right eye $(x_7, y_7)$. The feature positions are represented in (x, y) coordinates when the image indicated by the above-mentioned image data is represented on an x-y plane. Specifically, the technology disclosed in JP-B No. 101904/1996 can be used. The control section 21 calculates a center point $(x_3, y_3)$ between the inner corner of the left eye and the outer corner of the left eye as $x_3=(x_1+x)^2/2$ and $y_3=(y_1+y_2)/2$.

Based on the detection result at S42, the control section 21 calculates the opening degree information L1 indicating an eye opening degree and the rising eyebrow information L2 indicating an eyebrow rising degree using equations to be described in greater detail hereinafter and stores the calculated information in the storage section 24 at S43. Of the above-mentioned information, the L1 value is based on a distance between the upper and lower eyelids in the facial image and is calculated by Equation 1 (EQ (1)) expressed as the following.

$$L1=[(x_4-x_5)^2+(y_4-y_5)^2]^{0.5}/[(x_1-x_7)^2+(y_1-y_7)^2]^{0.5} \qquad \text{EQ (1)}$$

where $[(x_4-x_5)^2+(y_4-y_5)^2]^{0.5}$ represents a distance between the upper and lower eyelids in the facial image and $[(x_1-x_7)^2+(y_1-y_7)^2]^{0.5}$ represents a distance between inner corners of the left and right eyes.

Generally, any expression change causes a small change in the distance between inner corners of the left and right eyes. A value relative to the distance between inner corners of the left and right eyes can be acquired by dividing the distance between inner corners of the left and right eyes into the distance between the upper and lower eyelids. By using a ratio between distances as described, the problem associated with a change in the distance between the photographic apparatus 10 and the head of the driver 3 can be solved. As will be appreciated, such a change in the camera-subject distance changes the apparent distance between the upper and lower eyelids as measured from the facial image data. For the same reason, the L2 value, to be described in greater detail hereinafter, is calculated based on a distance between inner corners of the left and right eyes.

The L2 value is based on the distance between the eyebrow and the eye and is calculated by Equation 2 (EQ(2)) expressed as the following.

$$L2=[(x_6-x_3)^2+(y_6-y_3)^2]^{0.5}/[(x_1-x_7)^2+(y_1-y_7)^2]^{0.5}| \qquad \text{EQ(2)}$$

where $[(x_6-x_3)^2+(y_6-y_3)^2]^{0.5}$ represents a distance between the center between inner and outer corners of the left eye and the upper end of the left eyebrow.

The control section 21 stores the calculated L1 and L2 values in the storage section 24. The storage section 24 can store the multiple L1 and L2 values. Each time the L1 and L2 values are calculated at S43, the number of these values stored in the storage section 24 is incremented by one. After S43, the control section 21 then increments variable j, such as j=j+1, at S44. When variable j is less than or equal to specified value m, corresponding to YES at S45, the process returns to S42. When variable j is not less than or equal to specified value m, corresponding to NO at S45, the process terminates, and the storage section 24 stores m counts of the L1 and L2 values.

Figure 8:
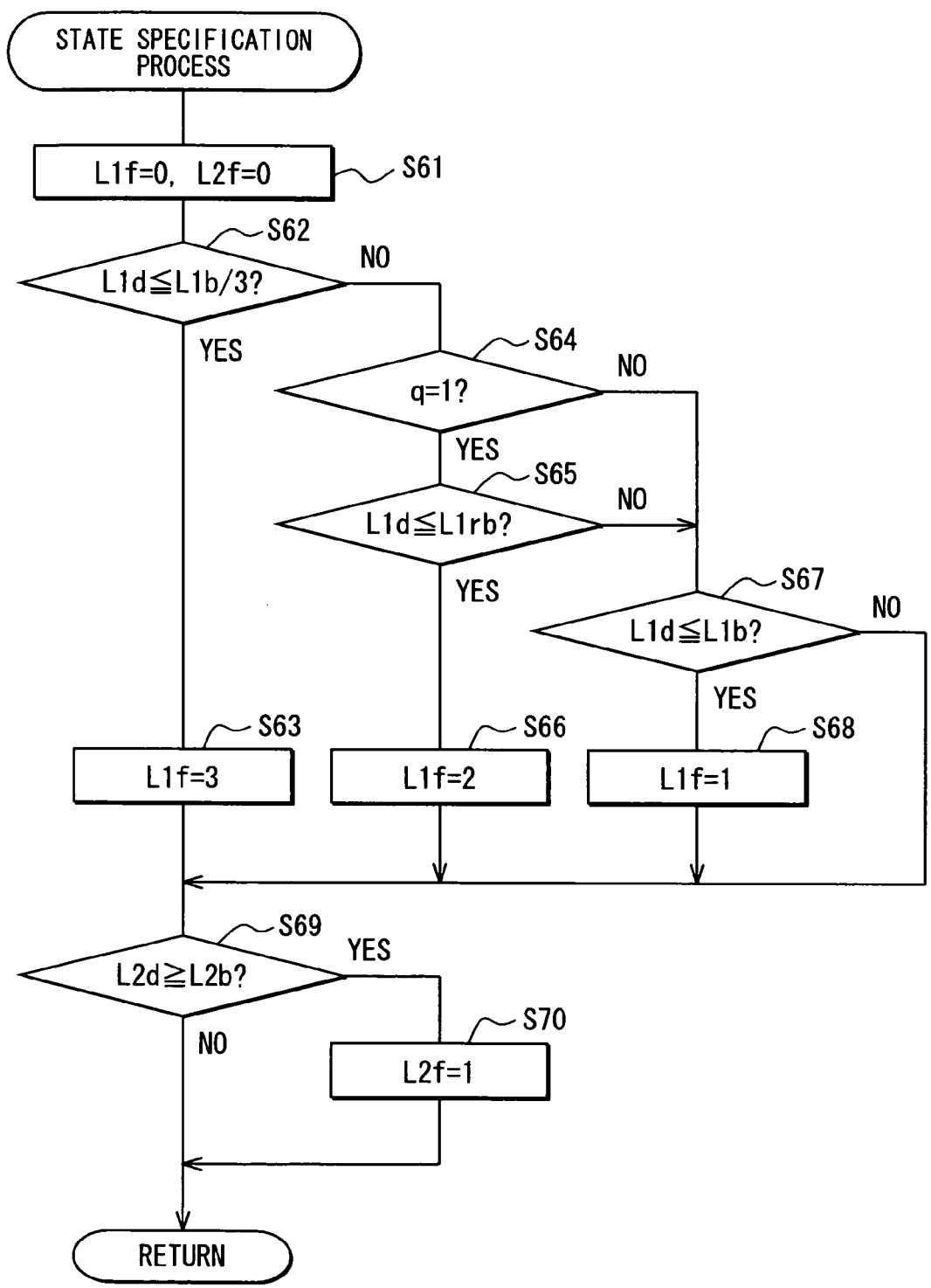
FIG. 8 is a flowchart illustrating an exemplary state specification process.

With reference to FIG. 8, when the state specification process starts, the control section 21 first sets variables L1$f$ and L2$f$ to 0s at S61. The control section 21 determines whether the eye of the driver 3 is closed at S62. The control section 21 compares the L1$b$ value with the L1$d$ value. The L1$b$ value is calculated at S7 of the wakefulness data collection process. The L1$d$ value is calculated at S23 of the doze prevention alarm process. The control section 21 assumes the eye to be closed when the L1$d$ value is less than or equal to a specified value such as, according to the present embodiment, one third of the L1$b$ value as a threshold value for the open eye detection corresponding to YES at S62. That is, the control section 21 assumes the eye to be closed when closed so as to be less than or equal to one third of the degree of openness associated with the wakefulness state, whereupon the control section 21 sets variable L1$f$ to 3 at S63 and the process then proceeds to S69.

When the L1$d$ value is not less than or equal to the above-mentioned value, corresponding to NO at S62, the process proceeds to S64. When variable q is 1, corresponding to YES at S64, the process proceeds to S65. When variable q is not 1, corresponding to NO at S64, the process proceeds to S67.

When the above-mentioned condition at S64 is satisfied and after the drowsiness is detected, the control section 21 determines whether the eye opening degree further decreases at S65. The control section 21 compares the L1$d$ value with the L1$rb$ value. The L1$d$ value is calculated at S23 of the doze prevention alarm process. The L1$rb$ value is calculated at S90 of the drowsiness stage determination process to be described in greater detail hereinafter. The L1$rb$ value is based on the eye opening degree detected immediately after the drowsiness stage determination process determines the drowsiness to be at stage 2. When L1$d$ is less than or equal to L1$rb$, corresponding to YES at S65, the eye of the driver 3 is further closed immediately after the drowsiness is determined, in which case the control section 21 sets variable L1$f$ to 2 at S66. The process then proceeds to S69.

When L1$d$ is not less than or equal to L1$rb$, corresponding to NO at S65, the control section 21 determines whether the eye opening degree is smaller than the wakefulness state at S67. The control section 21 compares the L1$b$ value with the L1$d$ value. When L1$d$ is less than or equal to L1$b$, corresponding to YES at S67, the eye of the driver 3 is closed more than the wakefulness state. The control section 21 sets variable L1$f$ to 1 at S68. The process proceeds to S69. When L1$d$ is not less than or equal to L1$b$, corresponding to NO at S67, the process proceeds to S69 without changing variable L1$f$.

The control section 21 then compares the L2$b$ value calculated at S7 of the wakefulness data collection process with the L2$d$ value calculated at S23 of the doze prevention alarm process at S69.

When the L2$d$ value is greater than or equal to the L2$b$ value, corresponding to YES at S69, the distance between the eyebrow and the eye becomes greater than that in the wakefulness state. The control section 21 sets variable L2$f$ to 1 at S70 and terminates the process. When the L2$d$ value is not greater than or equal to the L2$b$ value, corresponding to NO at S69, the control section 21 terminates the process without changing variable L2$f$.

Figure 9:
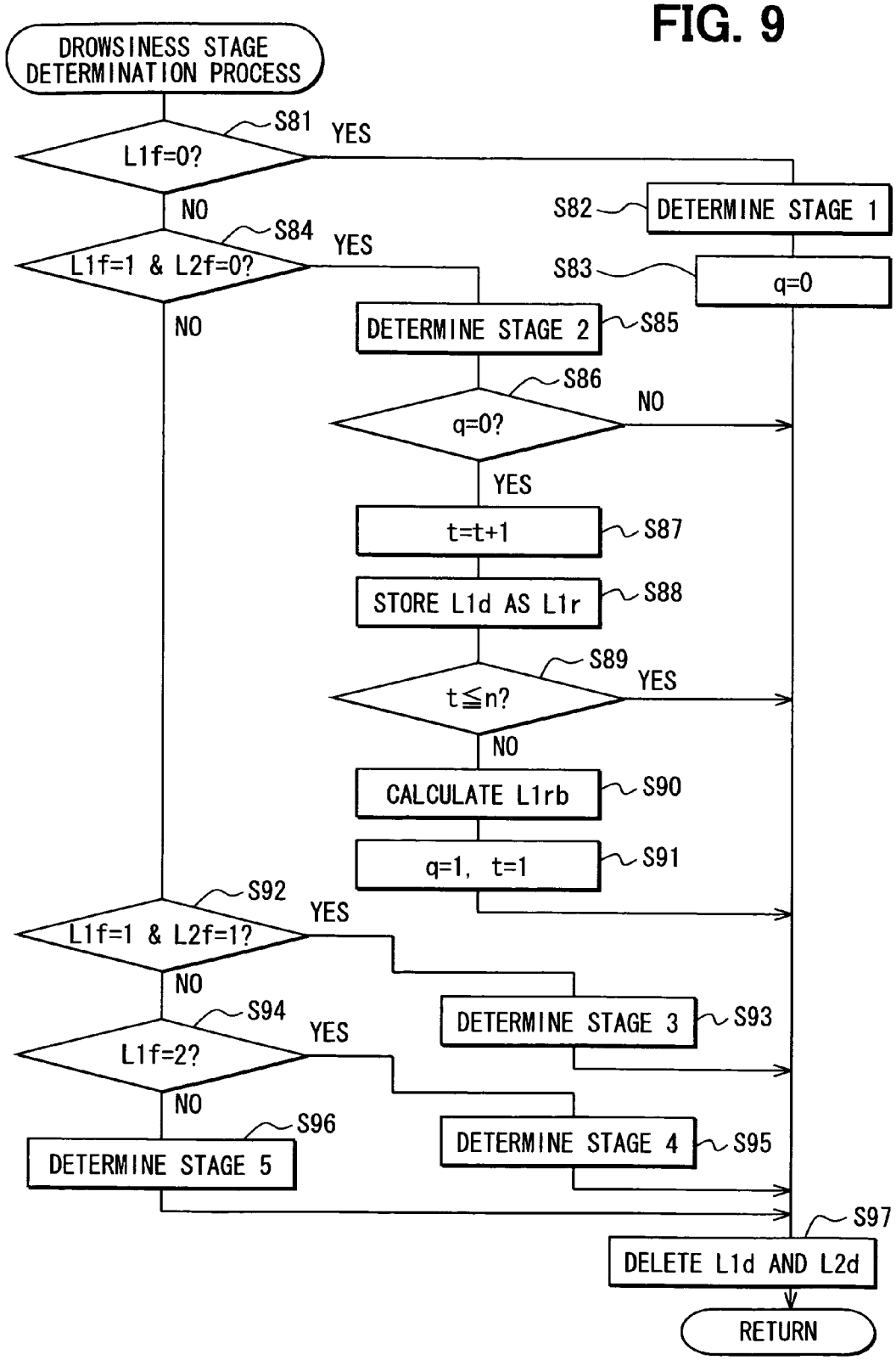
FIG. 9 is a flowchart illustrating an exemplary drowsiness stage determination process.

With reference to FIG. 9, when the drowsiness stage determination process starts, the control section 21 determines whether variable L1$f$ is 0 at S81. When L1$f$ is 0, corresponding to YES at S81, no state change is detected due to the drowsiness. The control section 21 determines the drowsiness level to be stage 1 at S82. The control section 21 sets variable q to 0 at S83. The process proceeds to S97.

When L1$f$ is not 0, corresponding to NO at S81, the control section 21 determines whether variable L1$f$ is 1 and variable L2$f$ is 0 at S84. When this condition is satisfied, corresponding to YES at S84, the eye is closed more than the wakefulness state and the eyebrow is not raised in comparison with the wakefulness state. The control section 21 determines the drowsiness level to be stage 2 at S85. The process proceeds to S86. When the above-mentioned condition is not satisfied, corresponding to NO at S84, the process proceeds to S92.

When the drowsiness level is determined at S85, the control section 21 determines whether variable q is 0 at S86. When variable q is not 0, corresponding to NO at S86, the process proceeds to S97. When variable q is 0, corresponding to YES at S86, the control section 21 increments variable t (t=t+1) at S87. The control section 21 then assumes L1$d$ to be L1$r$ and stores it in the storage section 24 at S88. The storage section 24 can store multiple L1$r$ values. Each time the process at S88 is performed, the number of L1$r$ values stored in the storage section 24 is incremented by one.

The control section 21 determines whether variable t is less than or equal to specified value n at S89. When variable t is less than or equal to specified value n, corresponding to YES at S89, the process proceeds to S97. When variable t is not less than or equal to specified value n, corresponding to NO at S89, n or more L1$r$ values are stored. The control section 21 calculates L1$rb$ used at S65 of the state specification process at S90.

The control section 21 reads all the n L1$r$ values stored at S88 in the storage section 24. Assuming an average value to be $\mu$ and a standard deviation to be $\sigma$ in a normal distribution made of all the L1$r$ values. The control section 21 calculates a value equivalent to $\sigma - 2\sigma$ as L1$rb$. The control section 21 stores the calculated L1$rb$ value in the storage section 24 and deletes the L1$r$ value stored in the storage section 24. The control section 21 sets variables q and t to 1s at S91. The process proceeds to S97.

When the condition at S84 is not satisfied, the control section 21 then determines whether variables L1$f$ and L2$f$ are set to 1s at S92, and, when the condition is satisfied, corresponding to YES at S92, the eye is closed more than the wakefulness state and the eyebrow is raised. The control section 21 determines the drowsiness level to be stage 3 at S93. The process proceeds to S97.

When the above-mentioned condition is not satisfied, corresponding to NO at S92, the control section 21 determines whether variable L1$f$ is 2 at S94. When L1$f$ is 2, corresponding to YES at S94, the eye is closed more than the state where the eye is determined to be closed more than the wakefulness state. The control section 21 determines the drowsiness level to be stage 4 at S95. The process proceeds to S97. When L1$f$ is not 2, corresponding to NO at S94, L1$f$ is set to 3 and the eye is closed. The control section 21 determines the drowsiness level to be stage 5 at S96. The process proceeds to S97.

The control section 21 deletes L1$d$ and L2$d$ from the storage section 24 at S97 and terminates the process.

According to the above-mentioned construction, the drowsiness determination apparatus 20 of the first embodiment can detect a sign of decreased wakefulness and determine whether the driver 3 is drowsy. In addition, the apparatus can determine drowsiness levels by combining results of detecting signs of a decreased wakefulness and a struggle by the driver 3 to maintain wakefulness.

In some cases determining a drowsiness level by dividing a determined level into multiple ranks can be performed based only on a result of detecting a sign of the decreased awakening. In such case, a level of the sign of the decreased wakefulness as a detection result needs to be subdivided into smaller ranks based on multiple threshold values according to the number of targeted ranks. However, because of differences among individuals, errors associated with detecting signs of decreased wakefulness or levels of signs showing drowsiness increase. As the number of ranks increases, accurately classifying the above-mentioned detection result becomes difficult. The detection result is less accurately classified.

However when the drowsiness level is determined by combining the sign detection results, each of the sign detection results need not be subdivided into the number of targeted ranks. Decreasing the number of ranks to be classified for the detection results makes it possible to easily and accurately classify the respective detection results. Combining the detection results can highly accurately determine a drowsiness level.

The drowsiness determination apparatus 20 can determine the drowsiness level based on a combination of an eye opening degree and a distance between the eyebrow and the eye. The embodiment provides three threshold values for the eye opening degree and one threshold value for the distance between the eyebrow and the eye. A combination of the threshold values can be used to determine five ranks of drowsiness levels, such as stages 1 through 5.

The drowsiness determination apparatus 20 can determine the drowsiness level based on the facial image data indicating a facial image captured by the photographic apparatus. The drowsiness determination apparatus 20 can easily determine the drowsiness level of a subject without directly providing the subject with an apparatus for detecting eyelid and eyebrow movements.

According to the above-mentioned construction, the doze prevention system 1 can be mounted on the vehicle 2 and determine the drowsiness level of the driver 3 in the vehicle 2.

Since the drowsiness determination apparatus 20 coordinates with the alarm apparatus 30, the doze prevention system 1 provides screen displays and audio outputs in accordance with determination results of drowsiness levels. The neck air conditioning apparatus 40, the seat belt vibrating apparatus 50, and the brake control apparatus 60 operate in accordance with determination results of drowsiness levels. The system can appropriately inhibit the driver 3 from dozing in accordance with drowsiness levels and prevent an accident due to drowsy driving.

The above-mentioned photographic apparatus 10 can amount to a capturing means according to various exemplary embodiments. Further, S23 as shown in FIG. 5 and described herein, S43 as shown in FIG. 6 and described herein, and S62, S63, S65, S66, S67, and S68 as shown in FIG. 8 and described herein can form a decreased wakefulness detection means according to various exemplary embodiments. S23 as shown in FIG. 5 and described herein, S43 as shown in FIG. 6 and described herein, and S69 and S70 as shown in FIG. 8 and described herein can form a struggle detection means according to various exemplary embodiments. S81, S82, S84, S85, S92, S93, S94, S95, and S96 as shown in FIG. 9 and described herein can form a drowsiness determination means according to various exemplary embodiments. S42 as shown in FIG. 6 and described herein can form a position information detection means according to various exemplary embodiments.

Second Embodiment

The doze prevention system 1 according to a second embodiment has basically the same construction as the first embodiment and performs determination using the same determination principle as the first embodiment. However, some processes of the control section 21 are changed and will be described below.

Various processes performed by the drowsiness determination apparatus 20 of the doze prevention system according to the second embodiment will be described. Compared to the first embodiment, the second embodiment uses a different method of specifying state changes based on the drowsiness. The position information detection process can be the same or generally the same as that in the first embodiment.

Figure 10:
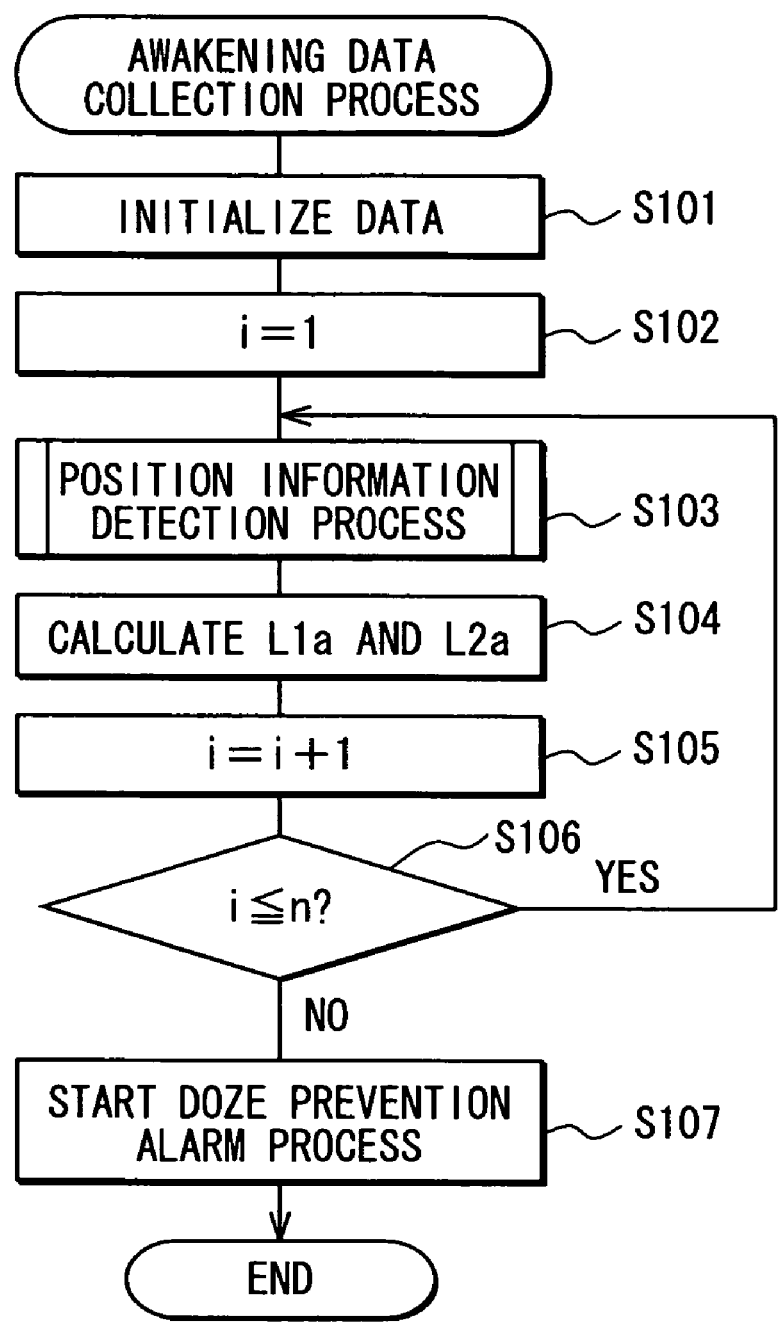
FIG. 10 is a flowchart illustrating an exemplary wakefulness data collection process.

With reference to FIG. 10, when variable i is not less than or equal to specified value n, corresponding to NO at S106, the control section 21 starts the doze prevention alarm process at S107 without proceeding to a step equivalent to S7 of the wakefulness data collection process according to the first embodiment and terminates the wakefulness data collection process.

According to the first embodiment, the storage section 24 stores L1$b$ and L2$b$ when the wakefulness data collection process terminates. According to the second embodiment, however, the storage section 24 stores n values each of L1$a$ and L2$a$ at the same time.

Figure 11:
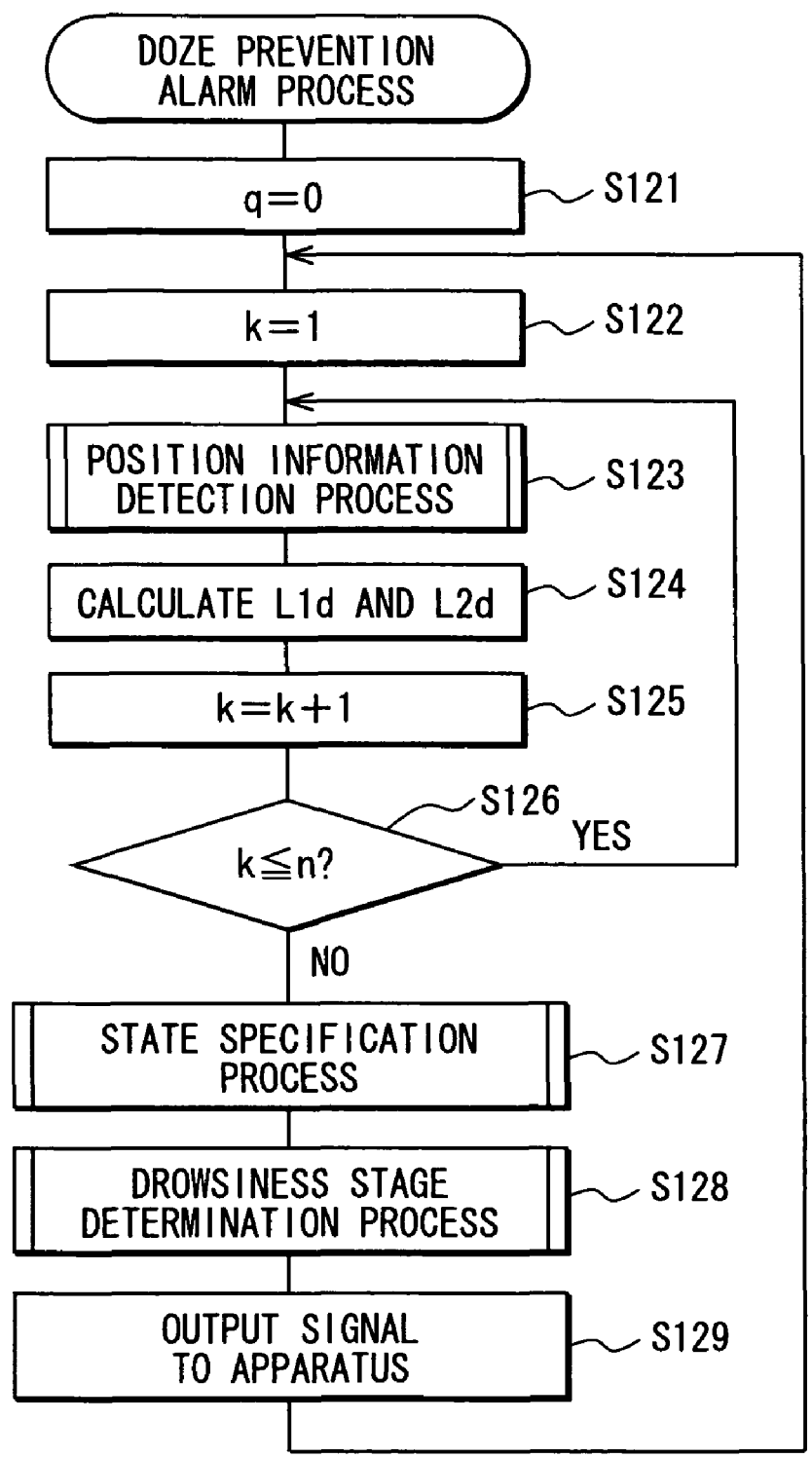
FIG. 11 is a flowchart illustrating an exemplary doze prevention alarm process.

With reference to FIG. 11, when the doze prevention alarm process starts at S107 of the wakefulness data collection process, the control section 21 sets variable q to 0 at S121. The control section 21 then sets variable t to 1 at S122. The control section 21 performs the above-mentioned position information detection process to calculate m L1 and L2 values at S123. The control section 21 calculates representative values L1$d$ and L2$d$ based on the L1 and L2 values calculated at S123 at S124. The control section 21 calculates the representative values similarly to S23 of the doze prevention alarm process. The control section 21 allows the storage section 24 to store the calculated L1$d$ and L2$d$ values. The storage section 24 can store the above-mentioned multiple values of L1$d$ and L2$d$. Each time the above-mentioned values are calculated at S124, the number of these values stored in the storage section 24 is incremented by one.

The control section 21 then increments variable k (k=k+1) at S125. When variable k is less than or equal to specified value n, corresponding to YES at S126, the process returns to S123. When variable k is not less than or equal to specified value n, corresponding to NO at S126, the process proceeds to S127. At the same time, the storage section 24 stores the L1$d$ and L2$d$ values each of which counts to n. The control section 21 then performs the state specification process for specifying eye and eyebrow states of the driver 3 at S127.

The control section 21 determines changes in the eye opening degree and the distance between the eyebrow and the eye based on L1$d$ and L2$d$ calculated at S124, L1$a$ and L2$a$ calculated at S104 of the wakefulness data collection process, and L1$r$ to be calculated in the drowsiness stage determination process to be described in greater detail hereinafter. The L1$r$ value is used only after calculated in the drowsiness stage determination process. The state specification process will be described in detail later. The control section 21 performs the drowsiness stage determination process for determining the drowsiness level of the driver 3 at S128.

The control section 21 determines the drowsiness level in terms of stages 1 through 5 based on the eye and eyebrow states specified at S127. The drowsiness level is lowest at stage 1 and highest at stage 5. The drowsiness stage determination process will be described in greater detail hereinafter.

The control section 21 allows the output section 25 to output signals for operating the alarm apparatus 30, the neck air conditioning apparatus 40, the seat belt vibrating apparatus 50, and the brake control apparatus 60 based on the drowsiness level determined at S128 at S129. The control section 21 performs the process equal to S26 of the doze prevention alarm process according to the first embodiment. The process then returns to S122. The doze prevention alarm process continues until the stop button of the input section 23 is pressed or a power output section such as an engine of the vehicle 2 stops and control over the entire vehicle terminates.

Figure 12:
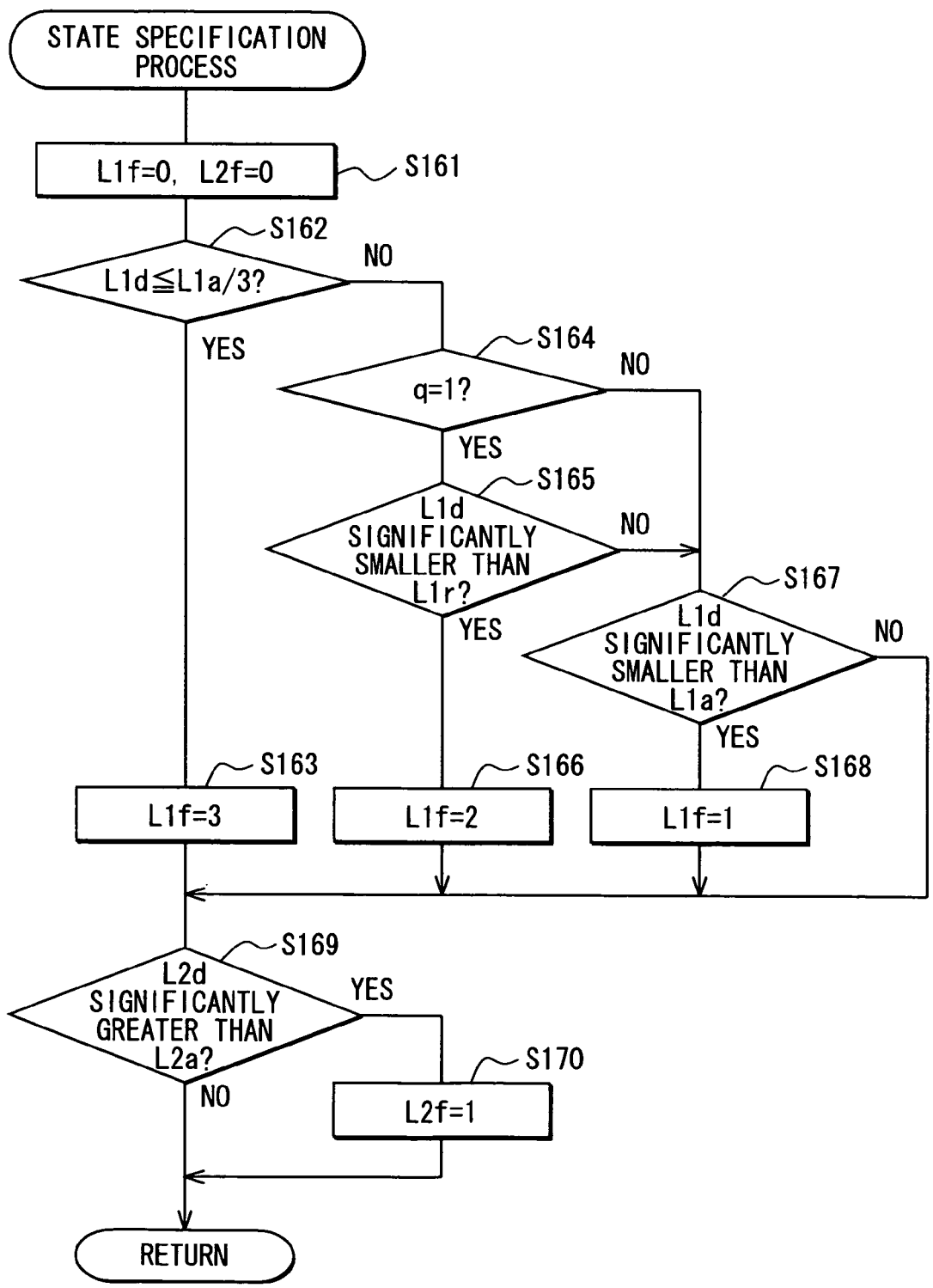
FIG. 12 is a flowchart illustrating a an exemplary state specification process.

With reference to FIG. 12, when the state specification process starts, the control section 21 sets variables L1$f$ and L2$f$ to 0s at S161. The control section 21 determines whether the eye of the driver 3 is closed at S162. The control section 21 compares an average L1$a$ value with an average L1$d$ value. The L1$a$ value is calculated at S104 of the wakefulness data collection process. The L1$d$ value is calculated at S124 of the doze prevention alarm process. The control section 21 assumes the eye to be closed when the average L1$d$ value is less than or equal to a specified value such as one third of the average L1$a$ value according to the present embodiment, as a threshold value for the closed eye detection, corresponding to YES at S162. In such a case, the control section 21 sets variable L1$f$ to 3 at S163. The process proceeds to S169. When the average L1$d$ value is not less than or equal to the above-mentioned value, corresponding to NO at S162, the process proceeds to S164. When variable q is 1, corresponding to YES at S164, the process proceeds to S165. When variable q is not 1, corresponding to NO at S164, the process proceeds to S167.

When the above-mentioned condition at S164 is satisfied and after the drowsiness is detected, the control section 21 determines whether the eye opening degree decreases at S165. The control section 21 performs a compatible t-test based on the n $L1d$ values calculated at S124 of the doze prevention alarm process and n $L1r$ values stored at S187 of the drowsiness stage determination process to be described in greater detail hereinafter. The state specification process assumes a significant level to be 5% for the compatible t-test. When the average $L1d$ value is significantly smaller than the average $L1r$ value, corresponding to YES at S165, the eye of the driver 3 is closed more than the state immediately after the drowsiness is detected, in which case, the control section 21 sets variable $L1f$ to 2 at S166. The process proceeds to S169.

When the average $L1d$ value is not significantly smaller than the average $L1r$ value, corresponding to NO at S165, the control section 21 determines whether the eye opening degree is smaller than the wakefulness state at S167. The control section 21 performs a compatible t-test based on n $L1a$ values calculated at S104 of the wakefulness data collection process and n $L1d$ values calculated at S124 of the doze prevention alarm process at S167.

When the average $L1d$ value is significantly smaller than the average $L1a$ value, corresponding to YES at S167, the eye of the driver 3 is closed more than the wakefulness state. The control section 21 sets variable $L1f$ to 1 at S166. The process proceeds to S169. When the average $L1d$ value is not significantly smaller than the average $L1a$ value, corresponding to NO at S167, the process proceeds to S69 without changing variable $L1f$.

The control section 21 performs a compatible t-test based on n $L2a$ values calculated at S104 of the wakefulness data collection process and n $L2d$ values calculated at S124 of the doze prevention alarm process at S169.

When the average $L2d$ value is significantly greater than the average $L2a$ value, corresponding to YES at S169, the distance between the eyebrow and the eye is larger than that in the wakefulness state, in which case, the control section 21 sets variable $L2f$ to 1 at S170 and the process terminates. When the average $L2d$ value is not significantly greater than the average $L2a$ value, corresponding to NO at S169, the control section 21 terminates the process without changing variable $L1f$.

Figure 13:
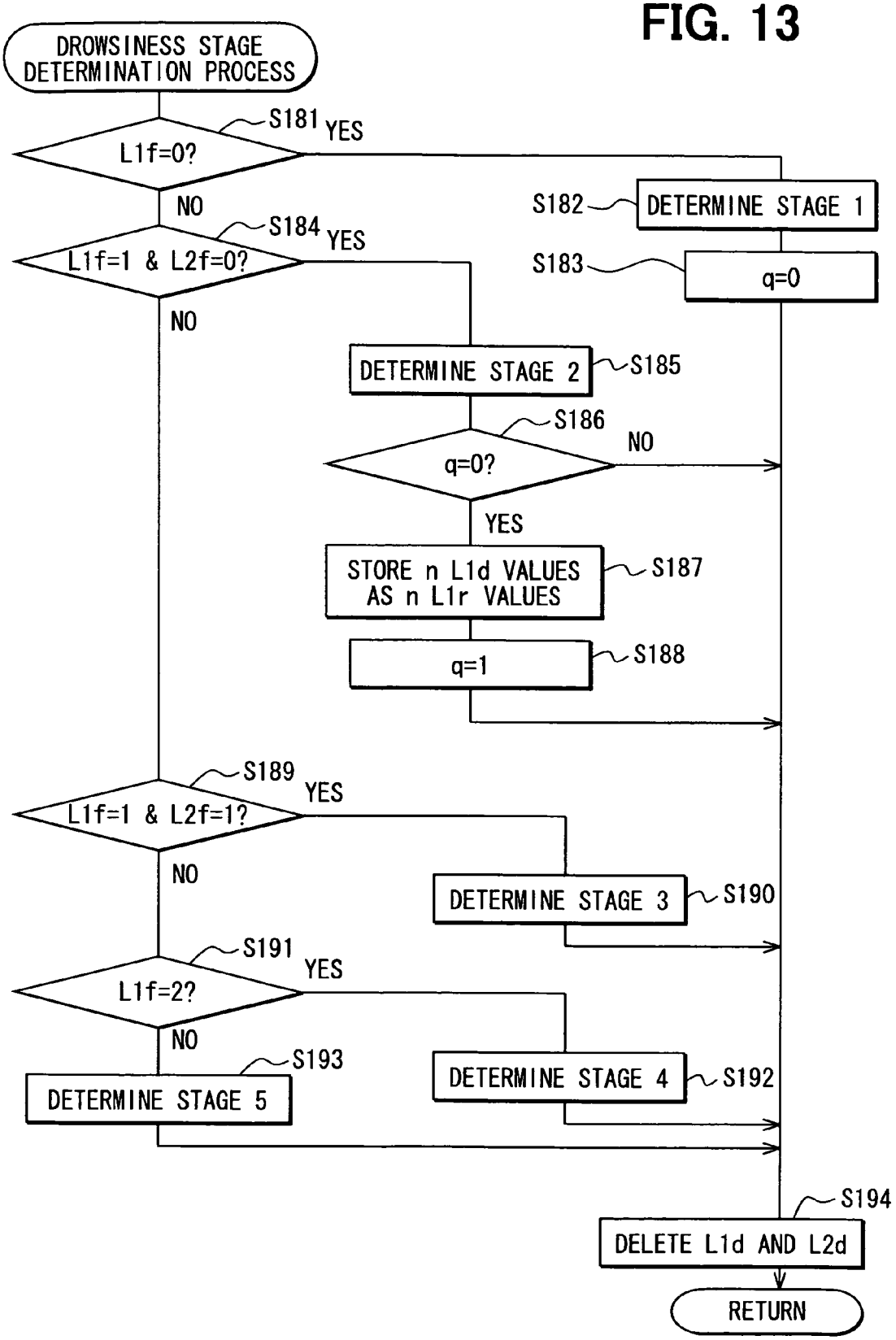
FIG. 13 is a flowchart illustrating a an exemplary drowsiness stage determination process.

With reference to FIG. 13, when the drowsiness stage determination process starts, the control section 21 determines whether variable $L1f$ is 0 at S181. When $L1f$ is 0, corresponding to YES at S181, no state change is detected due to the drowsiness. The control section 21 determines the drowsiness level to be stage 1 at S182. The control section 21 sets variable q to 0 at S183. The process proceeds to S197.

When $L1f$ is not 0, corresponding to NO at S181, the control section 21 determines whether variable $L1f$ is 1 and variable $L2f$ is 0 at S184. When this condition is satisfied, corresponding to YES at S184, the eye is closed more than the wakefulness state. The control section 21 determines the drowsiness level to be stage 2 at S185. The process proceeds to S186. When the above-mentioned condition is not satisfied, corresponding to NO at S184, the process proceeds to S189.

When the drowsiness level is determined at S185, the control section 21 determines whether variable q is 0 at S186. When variable q is not 0, corresponding to NO at S186, the process proceeds to S194. When variable q is 0, corresponding to YES at S186, the control section 21 allows the storage section 24 to store $L1d$ as $L1r$ at S187. At this time, the storage section 24 stores n $L1d$ values all of which are stored as n $L1r$ values. The control section 21 sets variables q to 1 at S188. The process proceeds to S194.

When the condition at S184 is not satisfied, the control section 21 then determines whether variables $L1f$ and $L2f$ are set to 1s at S189. When this condition is satisfied, corresponding to YES at S189, the eye is closed more than the wakefulness state and the eyebrow is raised. The control section 21 determines the drowsiness level to be stage 3 at S190. The process proceeds to S194.

When the above-mentioned condition is not satisfied, corresponding to NO at S189, the control section 21 determines whether variable $L1f$ is 2 at S191. When $L1f$ is 2, corresponding to YES at S191, the eye is closed more than the condition where the eye is determined to be closed more than the wakefulness state. The control section 21 determines the drowsiness level to be stage 4 at S192. The process proceeds to S193. When $L1f$ is not 2, corresponding to NO at S191, $L1f$ is set to 3 and the eye is closed. The control section 21 determines the drowsiness level to be stage 5 at S193. The process proceeds to S194 where control section 21 deletes $L1d$ and $L2d$ from the storage section 24 and terminates the process.

The drowsiness determination apparatus 20 and the doze prevention system 1 according to the second embodiment can also provide the same effects as those in the first embodiment. In the state specification process, the second embodiment uses a compatible t-test to determine changes in eye and eyebrow states at S165, S167, and S169. The determination result ensures higher reliability. The second embodiment can decrease chances of incorrect determination compared to the first embodiment.

In the above-mentioned embodiment, the photographic apparatus 10 can form the capturing means according to various exemplary embodiments. S43 shown in FIG. 6 and described herein, S124 shown in FIG. 11 and described herein, and S162, S163, S165, S166, S167, and S168 shown in FIG. 12 and described herein can form the decreased wakefulness detection means according to various exemplary embodiments. S43 shown in FIG. 6 and described herein, S124 shown in FIG. 11 and described herein, and S169 and S170 shown in FIG. 12 and described herein can form the struggle detection means according to various exemplary embodiments. S181, S182, S184, S185, S189, S190, S191, S192, and S193 shown in FIG. 13 and described herein can form the drowsiness determination means according to various exemplary embodiments. S42 shown in FIG. 6 and described herein can form the position information detection means according to various exemplary embodiments.

Third Embodiment

Figure 14:
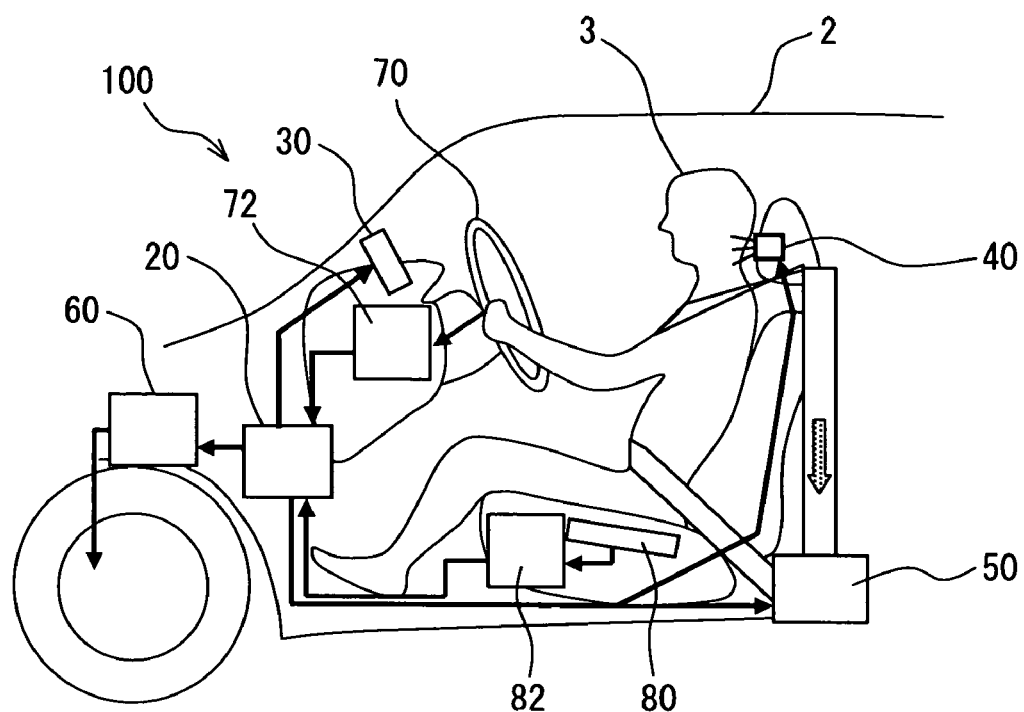
FIG. 14 is a diagram illustrating a side view of an exemplary doze prevention system according to a third embodiment.

Differently from previously described embodiments, a doze prevention system 100 according to the third embodiment includes a steering electrocardiographic sensor 70 equipped for a steering wheel and a seat-mounted electrocardiographic sensor 80 equipped for a seat instead of the photographic apparatus 10 as shown in FIG. 14.

The steering electrocardiographic sensor 70 and the seat-mounted electrocardiographic sensor 80 detect an electrocardiographic waveform signal of the driver 3 and transmit the signal to the drowsiness determination apparatus 20 through bioelectric amplifiers 72 and 82 provided for the sensors.

The drowsiness determination apparatus 20 includes the control section 21, the reception section 22, the input section 23, the storage section 24, and the output section 25 as shown in FIG. 2. The reception section 22 receives an electrocardiographic waveform signal from the steering electrocardiographic sensor 70 and the seat-mounted electrocardiographic sensor 80 through the bioelectric amplifiers 72 and 82. The electrocardiographic sensors 70 and 80 detect an electrocardiographic waveform signal. The control section 21 of the drowsiness determination apparatus 20 receives the electrocardiographic waveform signal from the reception section 22 and realtime stores the signal information in internal memory which can be referred to as built-in memory. Based on the signal information, the control section 21 thereafter performs the wakefulness data collection process, the doze prevention alarm process, the nerve information acquisition process, the state specification process, the drowsiness stage determination process to be described in greater detail hereinafter. During the drowsiness stage determination process, the control section 21 determines a drowsiness level based on four stages, stage 1 through 4. Stage 1 indicates the lowest drowsiness level and stage 4 the highest.

Based on the drowsiness level determined by the control section 21, the output section 25 allows the alarm apparatus 30, the neck air conditioning apparatus 40, the seat belt vibrating apparatus 50, and the brake control apparatus 60 to perform doze preventing operations to be described in greater detail hereinafter. Of these apparatuses, the alarm apparatus 30 warns the driver 3 against the drowsy driving by outputting the warning information to the display and outputting an audible message corresponding with the display content to the speaker. For example, the audible warning information includes "Take rest as soon as possible" at stage 2, "Attention" at stage 3, and "Stop driving" at stage 4.

The neck air conditioning apparatus 40 can send air to the neck of the driver 3 when the control section 21 determines a drowsiness level of any of stages 2 through 4. The seat belt vibrating apparatus 50 can vibrate the seat belt when the control section 21 determines a drowsiness level of stage 3 or 4. When the control section 21 determines a drowsiness level of stage 4, the brake control apparatus 60 operates the brake to forcibly stop or gradually decelerate the vehicle running.

Drowsiness levels according to the embodiment can be determined in accordance with physiological principles as will be described. It will be appreciated that the autonomous nervous system includes the sympathetic nerve and the parasympathetic nerve. The sympathetic nerve is active when one is awake or tense. The parasympathetic nerve is active when one sleeps or relaxes. When the drowsiness increases, the parasympathetic system becomes more active. When one struggles against the drowsiness, the sympathetic system becomes more active.

Figure 15A:
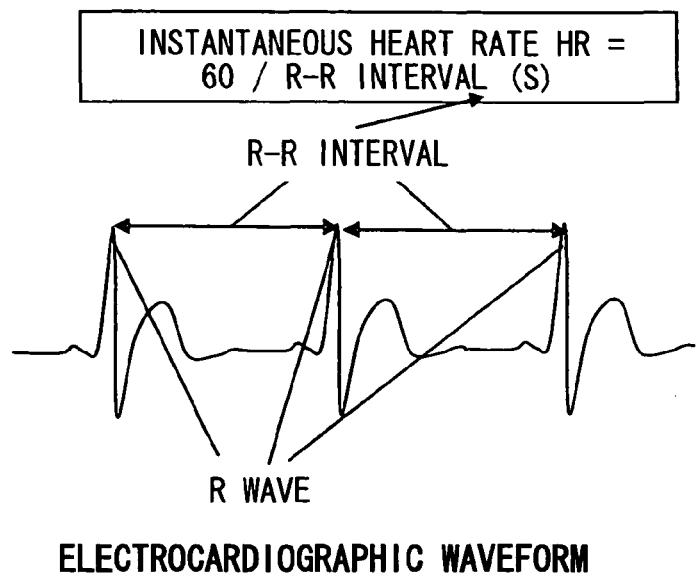
FIG. 15A is a diagram illustrating exemplary drowsiness determination according to a third embodiment.
Figure 15B:
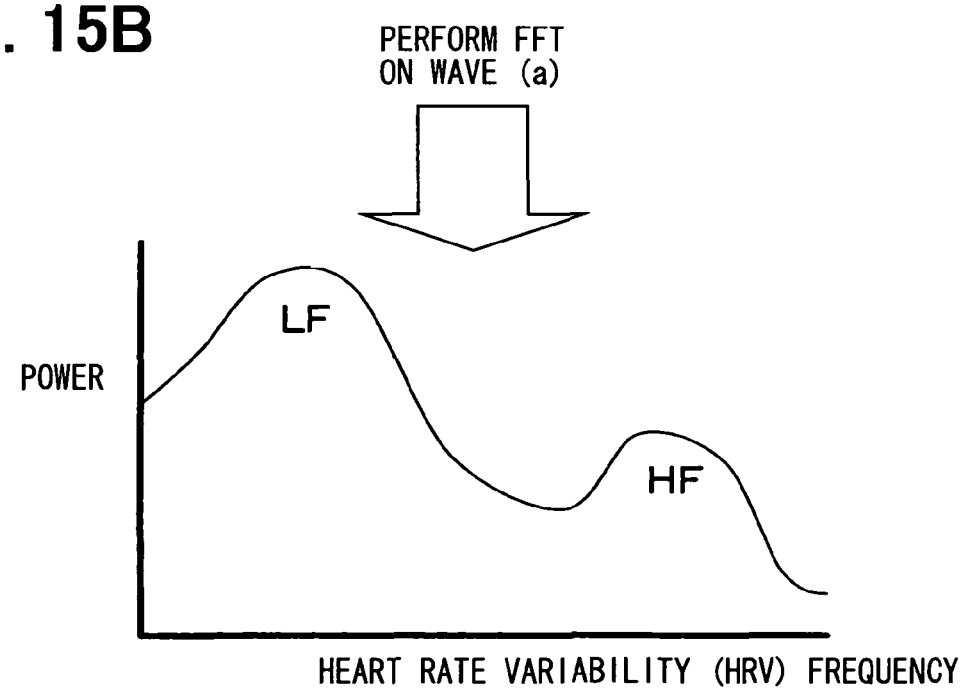
FIG. 15B is a diagram further illustrating exemplary drowsiness determination method according to a third embodiment.

Accordingly, a drowsiness level of the subject can be determined by measuring activities of the sympathetic nerve and the parasympathetic nerve and observing their changes. A specific solution is to measure an electrocardiographic waveform signal of the driver 3 and calculate an instantaneous heart rate HR as shown in FIG. 15A. The information from the waveform is analyzed using a fast fourier transform (FFT) to find high frequency (HF) domain of values and low frequency (LF) domain of values as shown in FIG. 15B.

A sympathetic activity index can be represented by LF/HF. A parasympathetic activity index can be represented by HF. Value L3 is assumed to denote a drowsiness sign and express L3=HF. Value L4 is assumed to denote a struggle sign and express L4=LF/HF. The drowsiness level is found based on the L3 and L4 values.

Specifically, the L3 and L4 values in the wakefulness state at stage 1 are assumed to be normal values. When the subject feels sleepy and decreases the awakening, the parasympathetic nerve is assumed to become active. The L3 value increases at stage 2.

For example, the subject may be aware of the need to stay awake while driving a vehicle, for example. When the drowsiness further increases, the subject struggles with the decreased awakening and may lose awareness. The sympathetic nerve is assumed to become active. The L4 value increases at stage 3. As the drowsiness further increases, the L3 value further increases at stage 4. In such a manner, the embodiment measures both the sympathetic nerve and the parasympathetic nerve and combines results to determine the drowsiness level.

Figure 16:
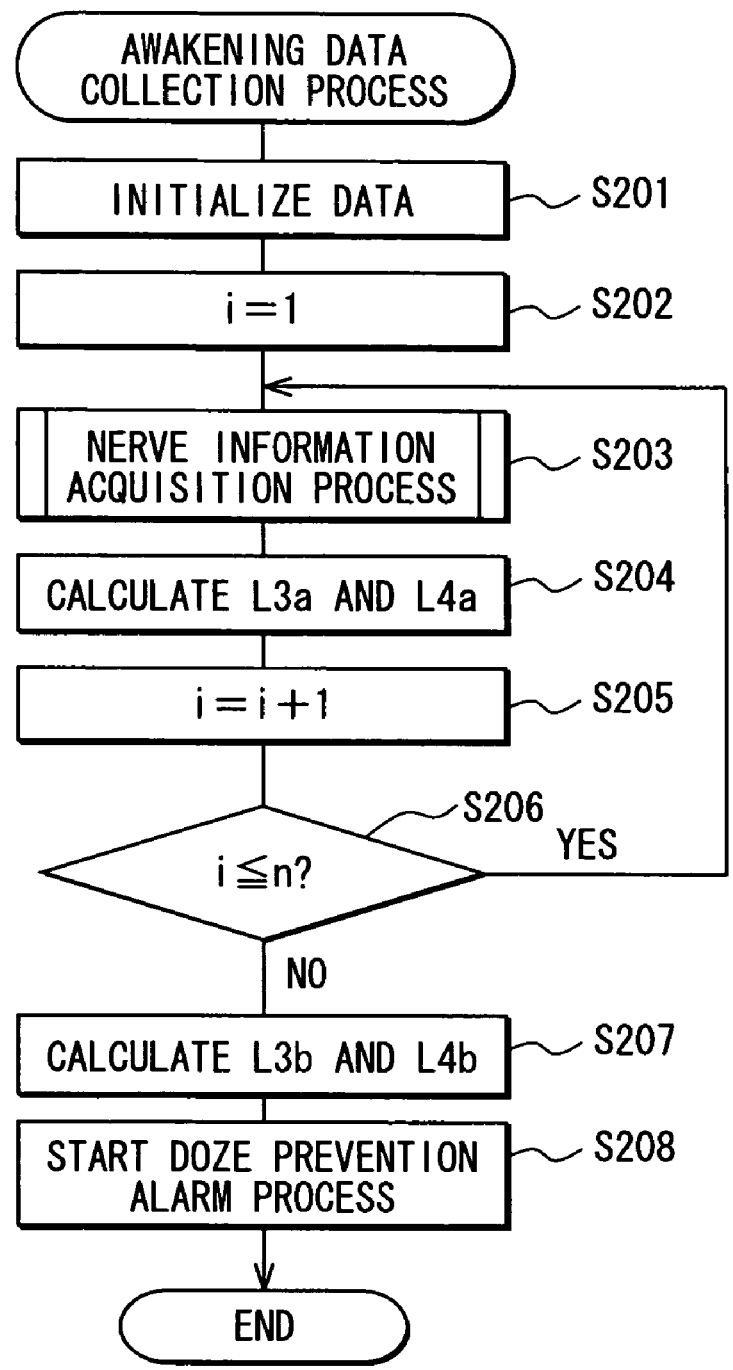
FIG. 16 is a flowchart illustrating an exemplary wakefulness data collection process.

With reference to FIG. 16, when the start button of the input section 23 is pressed, the wakefulness data collection process starts and the control section 21 first initializes data at S201. The control section 21 deletes signal information stored in its built-in memory and various data stored in the storage section 24. The control section 21 sets variable i to 1 at S202. The control section 21 performs the nerve information acquisition process for measuring activities of the sympathetic nerve and the parasympathetic nerve of the driver 3 at S203. The steering electrocardiographic sensor 70 or the seat-mounted electrocardiographic sensor 80 detects an electrocardiographic waveform signal. Based on the detected electrocardiographic waveform signal, the control section 21 calculates L3 and L4 for the specified number of times (m) and stores them in the storage section 24. At this time, the storage section 24 stores L3 and L4 each of which counts to m. The nerve information acquisition process will be described in greater detail hereinafter.

The control section 21 calculates representative values L3a and L4a based on the m L3 and L4 values calculated at S203 at S204. The control section 21 reads all the m L3 and L4 values stored in the storage section 24. The control section 21 calculates and sets L3a to a value that is 5% smaller than the value associated with the maximum cumulative relative frequency based on a frequency distribution of all the L3 values. Similarly, the control section 21 calculates and sets L4a to a value that is 5% smaller than the value associated with the maximum cumulative relative frequency based on a frequency distribution of all the L4 values.

The control section 21 stores the calculated L3a and L4a values in the storage section 24 and deletes the L3 and L4 values stored in the storage section 24. The storage section 24 can store the multiple L3a and L4a values. Each time the L3a and L4a values are calculated at S204, the number of these values stored in the storage section 24 is incremented by one.

The control section 21 then increments variable i (i=i+1) at S205. When variable i is less than or equal to specified value n, corresponding to YES at S206, the process returns to S203. When variable i is not less than or equal to specified value n, corresponding to NO at S206, the process proceeds to S207. At this time, the storage section 24 stores the L3a and L4a values each of which counts to n.

The control section 21 calculates L3b and L4b used for the state specification process to be described in greater detail hereinafter at S207.

The control section 21 reads all the n L3a and L4a values stored in the storage section 24 at S204. Let us assume an average value to be $\mu$ and a standard deviation to be $\sigma$ in a normal distribution made of all the L3a values. The control section 21 calculates a value equivalent to $\mu+2\sigma$ as L3b. Similarly, the control section 21 calculates a value equivalent to $\mu+2\sigma$ as L4b in a normal distribution made of all the L4a values. The control section 21 stores the calculated L3b and L4b values in the storage section 24 and deletes the L3a and L4a values stored in the storage section 24. The control section 21 starts the doze prevention alarm process at S208 and terminates the wakefulness data collection process.

Figure 17:
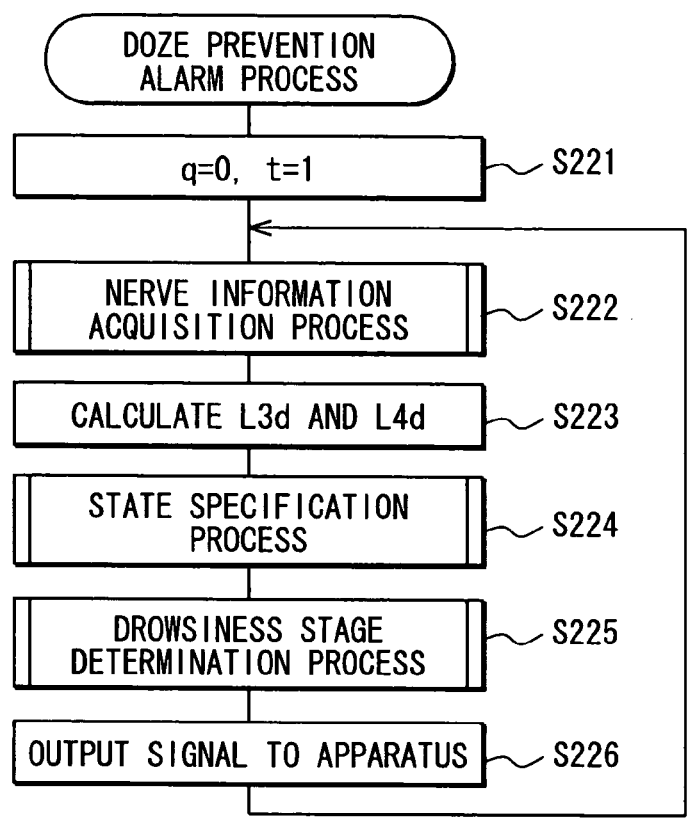
FIG. 17 is a flowchart illustrating an exemplary doze prevention alarm process.

With reference to FIG. 17, the following describes the doze prevention alarm process performed by the control section 21. The doze prevention alarm process starts at S208 of the wakefulness data collection process. The doze prevention alarm process starts to set variable q to 0 and variable t to 1 at S221.

Similarly to S203 of the wakefulness data collection process, the control section 21 performs the nerve information acquisition process for detecting activities of the sympathetic nerve and the parasympathetic nerve of the driver 3 at S222. The control section 21 calculates m L3 and L4 values and stores the calculated L3 and L4 values in the storage section 24. The nerve information acquisition process will be described in detail later.

The control section 21 calculates representative values L3$d$ and L4$d$ based on the L3 and L4 values calculated at S222 at S223. The control section 21 reads all the m L3 and L4 values stored in the storage section 24. The control section 21 calculates and sets L3$d$ to a value that is 5% smaller than the value associated with the maximum cumulative relative frequency based on a frequency distribution of all the L3 values. Similarly, the control section 21 calculates and sets L4$d$ to a value that is 5% smaller than the value associated with the maximum cumulative relative frequency based on a frequency distribution of all the L4 values.

The control section 21 stores the calculated L3$d$ and L4$d$ values in the storage section 24 and deletes the L3 and L4 values stored in the storage section 24. The control section 21 performs the state specification process for specifying states of the sympathetic nerve and the parasympathetic nerve of the driver 3 at S224. The control section 21 specifies states of the sympathetic nerve and the parasympathetic nerve based on L3$d$ and L4$d$ calculated at S223, L3$b$ and L4$b$ calculated at S207 of the wakefulness data collection process, and L3$rb$ calculated in the drowsiness stage determination process to be described in greater detail hereinafter. The L3$rb$ value is used only after calculated in the drowsiness stage determination process.

The control section 21 performs the drowsiness stage determination process for determining the drowsiness level of the driver 3 at S225. The control section 21 determines the drowsiness level in accordance with stages 1 through 4 based on the states of the sympathetic nerve and the parasympathetic nerve specified at S224. Stage 1 indicates the lowest drowsiness level and stage 4 the highest.

The control section 21 allows the output section 25 to output signals for operating the alarm apparatus 30, the neck air conditioning apparatus 40, the seat belt vibrating apparatus 50, and the brake control apparatus 60 based on the drowsiness level determined at S225 at S226. When the drowsiness level is determined to be stage 1 at S225, the control section 21 disallows the above-mentioned apparatuses to operate. When the drowsiness level is determined to be stage 2, the control section 21 allows the alarm apparatus 30 and the neck air conditioning apparatus 40 to operate. When the drowsiness level is determined to be stage 3, the control section 21 allows the alarm apparatus 30, the neck air conditioning apparatus 40, and the seat belt vibrating apparatus 50 to operate. When the drowsiness level is determined to be stage 4, the control section 21 allows all of these apparatuses to operate. After S226, the process returns to S222.

The doze prevention alarm process continues until the stop button of the input section 23 is pressed or a power output section such as an engine of the vehicle 2 stops and control over the entire vehicle terminates.

Figure 18:
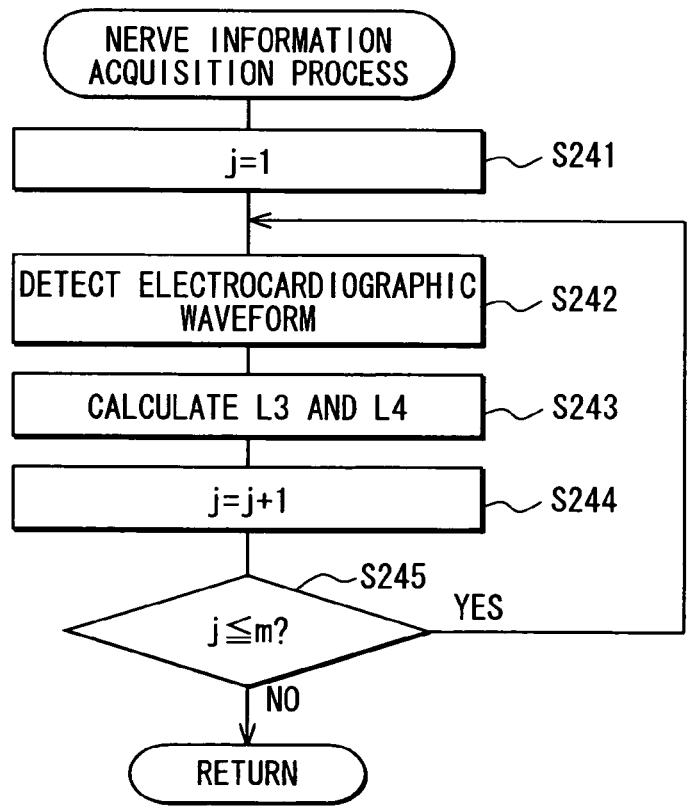
FIG. 18 is a flowchart illustrating an exemplary nerve information acquisition process.

With reference to FIG. 18, the following describes the nerve information acquisition process performed by the control section 21. The nerve information acquisition process can form S203 of the wakefulness data collection process or S222 of the doze prevention alarm process. In the nerve information acquisition process, the control section 21 first sets variable j to 1 at S241. The control section 21 allows the steering electrocardiographic sensor 70 or the seat-mounted electrocardiographic sensor 80 to detect an electrocardiographic waveform signal of the driver 3 at S242. An electrocardiographic waveform as shown in FIG. 15A is detected.

Based on the detection result at S242, the control section 21 calculates value L3 indicating a drowsiness sign and value L4 indicating a struggle sign and stores the values in the storage section 24 at S243. The control section 21 FFT-analyzes an electrocardiographic waveform, for example as shown in FIG. 15B, to find LF and HF and calculates the L3 and L4 values assuming L3=HF and L4=LF/HF. The control section 21 stores the calculated L3 and L4 values in the storage section 24. The storage section 24 can store the multiple L3 and L4 values. Each time the L3 and L4 values are calculated at S243, the number of these values stored in the storage section 24 is incremented by one. The control section 21 then increments variable j (j=j+1) at S244. When variable j is less than or equal to specified value m, corresponding to YES at S245, the process returns to S242. When variable j is not less than or equal to specified value m, corresponding to NO at S245, the process terminates. At this time, the storage section 24 stores the L3 and L4 values each of which counts to m.

Figure 19:
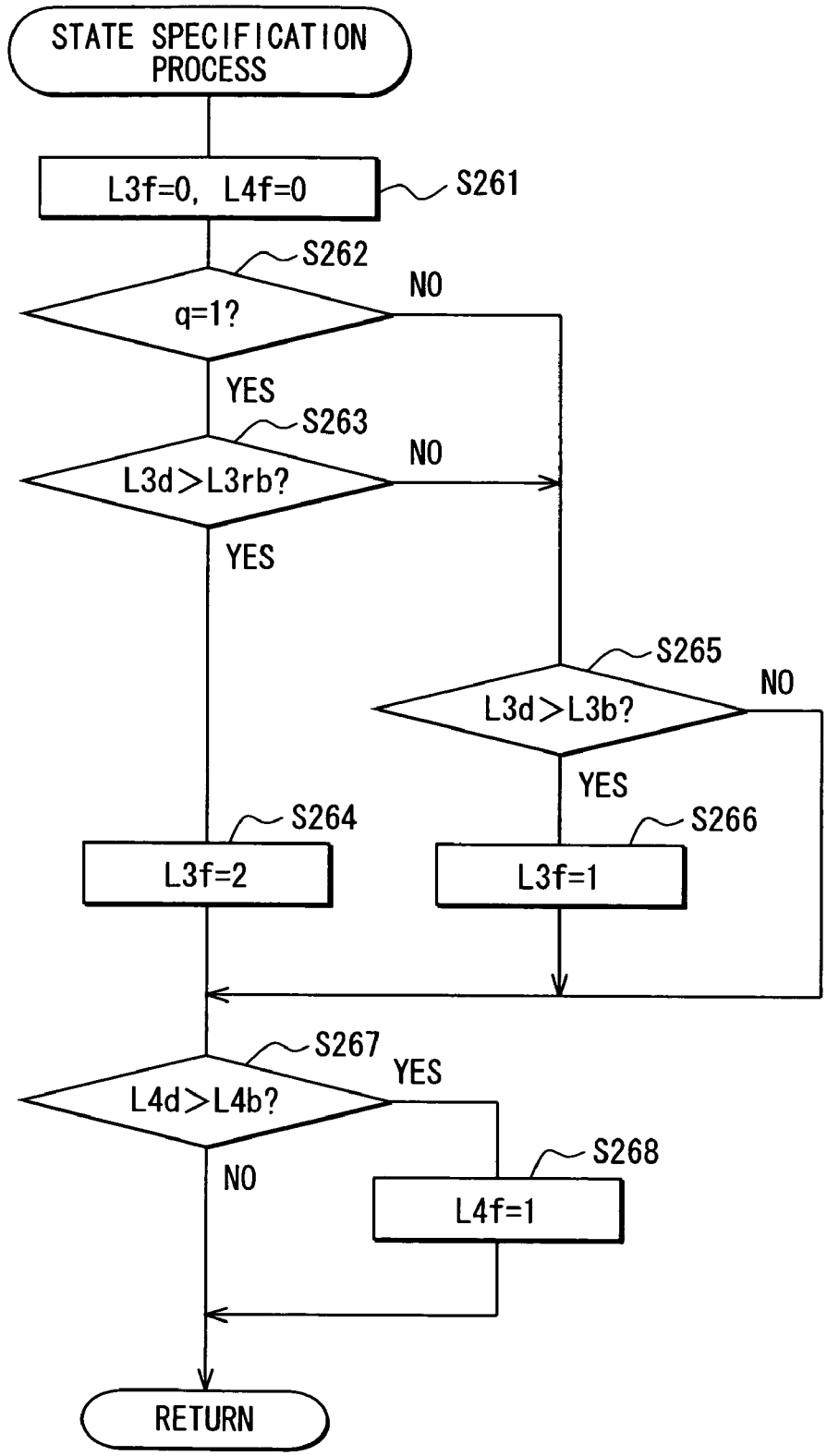
FIG. 19 is a flowchart illustrating an exemplary state specification process.

With reference to FIG. 19, the state specification process can form S224 of the doze prevention alarm process. When the state specification process starts, the control section 21 first sets variables L3$f$ and L4$f$ to 0s at S261. The control section 21 determines whether variable q is 1 at S262. When variable q is 1, corresponding to YES at S262, the process proceeds to S263. When variable q is not 1, corresponding to NO at S262, the process proceeds to S265. When the condition at S262 is satisfied, the control section 21 determines whether the drowsiness sign increases at S263 by comparing the L3$d$ value calculated at S223 of the doze prevention alarm process with the L3$rb$ value calculated at S290 of the drowsiness stage determination process to be described in greater detail hereinafter. The value L3$rb$ is a reference value based on the drowsiness sign detected immediately after the drowsiness stage determination process determines the drowsiness at stage 2. When the L3$d$ value is greater than the L3$rb$ value, corresponding to YES at S263, the drowsiness sign of the driver 3 is more significant than the sign first determined to be drowsy. The control section 21 sets variable L3$f$ to 2 at S264. The process proceeds to S267.

When the L3$d$ value is not greater than the L3$rb$ value, corresponding to NO at S263, the control section 21 determines whether the drowsiness sign is more significant than the wakefulness state at S267 by comparing the L3$b$ value calculated at S207 of the wakefulness data collection process with the L3$d$ value calculated at S223 of the doze prevention alarm process. When the L3$d$ value is greater than the L3$b$ value, corresponding to YES at S265, the drowsiness sign of the driver 3 is more significant than the wakefulness state. The control section 21 sets variable L1$f$ to 1 at S266. The process proceeds to S267. When the L3$d$ value is not greater than the L3$b$ value, corresponding to NO at S265, the process proceeds to S267 without changing variable L3$f$.

The control section 21 then compares the L4$b$ value calculated at S207 of the wakefulness data collection process with the L4d value calculated at S223 of the doze prevention alarm process at S267. When the L4d value is greater than or equal to the L4b value, corresponding to YES at S267, the struggle sign is more significant than the wakefulness state. The control section 21 sets variable L4f to 1 at S268 and terminates the process. When the L4d value is not greater than the L4b value, corresponding to NO at S267, the process terminates without changing variable L4f.

Figure 20:
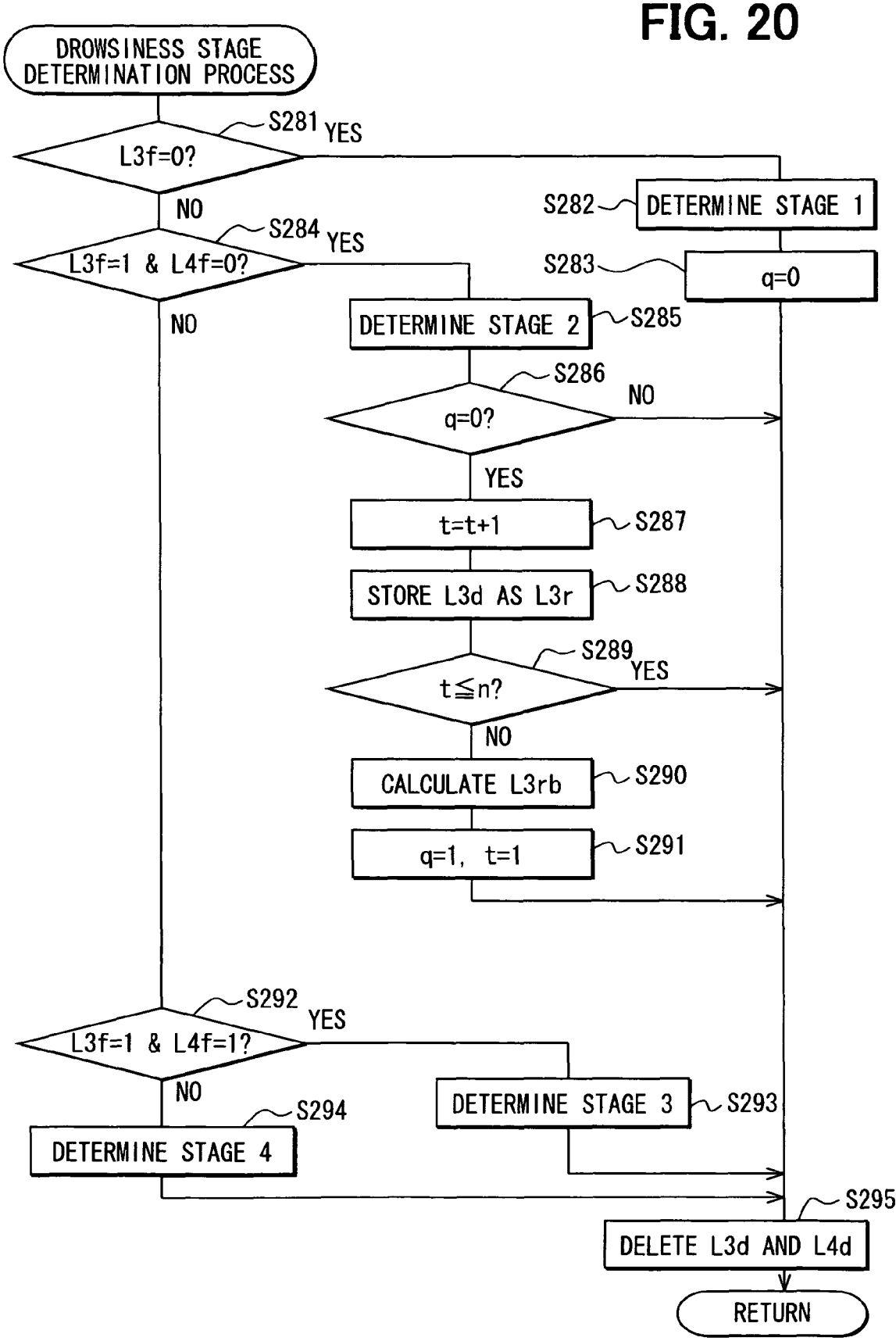
FIG. 20 is a flowchart illustrating an exemplary drowsiness stage determination process.

With reference to FIG. 20, the drowsiness stage determination process can form S225 of the doze prevention alarm process. When the drowsiness stage determination process starts, the control section 21 determines whether variable L3f is 0 at S281. When L3f is 0, corresponding to YES at S281, no change is detected in the drowsiness sign. The control section 21 determines the drowsiness level to be stage 1 at S282 and sets variable q to 0 at S283. The process proceeds to S295.

When L3f is not 0, corresponding to NO at S281, the control section 21 determines whether variable L3f is 1 and variable L4f is 0 at S284. When the condition is satisfied, corresponding to YES at S284, the drowsiness sign becomes more significant than the wakefulness state. The control section 21 determines the drowsiness level to be stage 2 at S285. The process proceeds to S286. When the above-mentioned condition is not satisfied, corresponding to NO at S284, the process proceeds to S292.

When the drowsiness level is determined at S285, the control section 21 then determines whether variable q is 0 at S286. When variable q is not 0, corresponding to NO at S286, the process proceeds to S295. When variable q is 0, corresponding to YES at S286, the control section 21 increments variable t (t=t+1) at S287. The control section 21 then assumes L3d to be L3r and stores it in the storage section 24 at S288. The storage section 24 can store multiple L3r values. Each time the process at S288 is performed, the number of L3r values stored in the storage section 24 is incremented by one.

The control section 21 determines whether variable t is less than or equal to specified value n at S289. When variable t is less than or equal to specified value n, corresponding to YES at S289, the process proceeds to S295. When variable t is not less than or equal to specified value n, corresponding to NO at S289, n or more L1r values are stored. The control section 21 calculates L3rb used at S264 of the state specification process at S290.

The control section 21 reads all the n L3r values stored at S288 in the storage section 24. Let us assume an average value to be $\mu$ and a standard deviation to be $\sigma$ in a normal distribution made of all the L3r values. The control section 21 calculates a value equivalent to $\mu+2\sigma$ as L3rb. The control section 21 stores the calculated L3rb value in the storage section 24 and deletes the L3r value stored in the storage section 24. The control section 21 sets variables q and t to 1s at S291. The process proceeds to S295.

When the condition is not satisfied, corresponding to NO at S284, the control section 21 then determines whether variables L3f and L4f are set to 1s at S292. When the condition is satisfied, corresponding to YES at S292, the drowsiness and struggle signs become more significant than the wakefulness state. The control section 21 determines the drowsiness level to be stage 3 at S293. The process proceeds to S295.

When the above-mentioned condition is not satisfied, corresponding to NO at S292, L3f is set to 2 and the drowsiness sign of the driver 3 is more significant than the sign first determined to be drowsy. The control section 21 determines the drowsiness level to be stage 4 at S294. The process proceeds to S295.

The control section 21 deletes L3d and L4d from the storage section 24 at S295 and terminates the process. According to the above-mentioned construction, the doze prevention system 100 of the third embodiment can highly accurately determine the drowsiness level based on activities of the parasympathetic nerve and the sympathetic nerve. The drowsiness determination apparatus 20 according to the embodiment can determine the drowsiness level by detecting activities of the parasympathetic nerve and the sympathetic nerve from an electrocardiographic waveform acquired from the steering electrocardiographic sensor 70 or the seat-mounted electrocardiographic sensor 80.

The doze prevention system 100 according to the embodiment can be mounted on the vehicle 2 and determine the drowsiness level of the driver 3 in the vehicle 2. Since the drowsiness determination apparatus 20 coordinates with the alarm apparatus 30, the doze prevention system 100 according to the embodiment provides screen displays and audio outputs in accordance with determination results of drowsiness levels. The neck air conditioning apparatus 40, the seat belt vibrating apparatus 50, and the brake control apparatus 60 operate in accordance with determination results of drowsiness levels. The system can appropriately inhibit the driver 3 from dozing in accordance with drowsiness levels and prevent an accident due to drowsy driving.

In the above-mentioned embodiment, the steering electrocardiographic sensor 70 and the seat-mounted electrocardiographic sensor 80 can form an electrocardiographic waveform acquisition means. S223 as shown in FIG. 17, S242 and S243 as shown in FIG. 18, and S263, S264, S265, and S266 as shown in FIG. 19 can form the decreased wakefulness detection means according to various exemplary embodiments. S223 as shown in FIG. 17 and described herein, S243 as shown in FIG. 18 and described herein, and S267 and S268 as shown in FIG. 19 and described herein can form the struggle detection means according to various exemplary embodiments. S281, S282, S284, S285, S292, S293, and S294 as shown in FIG. 20 and described herein can form the drowsiness determination means according to various exemplary embodiments.

While there have been described specific preferred embodiments of the present invention, it is to be distinctly understood that the present invention is not limited thereto but may be otherwise variously embodied within the spirit and scope of the invention.

For example, the first and second embodiments have exemplified the constructions of acquiring eye and eyebrow positions based on the facial image data captured by the photographic apparatus 10. However, capabilities of acquiring eye and eyebrow positions are not limited to specific constructions.

For example, an electrode may be attached to a face to detect feeble electricity generated in proportion to a force of moved facial muscles and accordingly acquire eyelid and eyebrow movements. Based on the movements, eye and eyebrow positions may be acquired.

According to the above-mentioned embodiments, the process of the drowsiness determination apparatus 20 starts when the start button provided for the input section 23 is pressed. However, the process may start when the other conditions are satisfied.

For example, the process may start simultaneously when the power output section such as an engine in the vehicle 2 starts. Alternatively, the vehicle may contain a vehicle speed sensor for measuring a vehicle's running speed. The process may start when the vehicle sensor detects an excess over a specified speed such as, for example, 30 km/h.

According to the first and second embodiments, the process of determining the drowsiness level to be stage 5 is preceded by the process of determining whether L1*f* is equal to 2 at S94, S191. When L1*f* is not equal to 2, such as when L1*f* is equal to 3 to indicate a closed eye, the drowsiness level is determined to be stage 5.

As shown in FIG. 3, however, the driver 3 shows no sign of struggle in the drowsy state at stage 5. Therefore, no sign of struggle (L2*f*=0) may be added as a condition of determining stage 5 so as to more accurately determine the drowsy state.

Specifically, the process at S94 and S191 may be changed to a process of determining a condition of L1*f*=3 and L2*f*=0. When this condition is satisfied, the drowsiness level is determined to be stage 5. The process proceeds to S96 and S193. When this condition is not satisfied, the drowsiness level is determined to be stage 4. The process proceeds to S95 and S192.

What is claimed is:

1. A drowsiness determination apparatus comprising:
   a decreased wakefulness detection means for detecting a sign of decreased wakefulness due to drowsiness based on an eye opening degree;
   a struggle detection means for detecting a sign of struggle against drowsiness based on a distance between an eyebrow and the eye just below the eyebrow; and
   a drowsiness determination means for determining a drowsiness level based on the sign of decreased wakefulness and the sign of struggle, wherein
   the drowsiness determination means determines no drowsiness when the sign of decreased wakefulness is not detected, determines possession of drowsiness when the sign of decreased wakefulness is detected, and determines a drowsiness level according to presence or absence of the sign of struggle in a state where the possession of drowsiness is determined;
   the drowsiness determination means determines:
   a condition A where the eye opening degree is less than or equal to a first threshold value;
   a condition B where the eye opening degree is less than or equal to a second threshold value smaller than the first threshold value; and
   a condition C where the distance between an eyebrow and the eye just below the eyebrow is greater than a specified threshold value; and wherein
   the drowsiness determination means determines a drowsiness level as strong drowsiness when the condition B is satisfied; and wherein
   the drowsiness determination means determines the drowsiness level as medium drowsiness lower than the strong drowsiness when the condition A and the condition C are satisfied and the condition B is not satisfied; and wherein
   the drowsiness determination means determines the drowsiness level as weak drowsiness lower than the medium drowsiness when the condition A is satisfied and the condition B and the condition C are not satisfied; and wherein
   the drowsiness determination means determines the drowsiness level as no drowsiness when the condition A and the condition B are not satisfied.

2. The drowsiness determination apparatus of claim 1, wherein
   the eye opening degree is based on a distance between an upper eyelid and a lower eyelid,
   the distance between an eyebrow and the eye just below the eyebrow is based on a distance between the center of outer corner and inner corner of the eye and an upper end of the eyebrow.

3. The drowsiness determination apparatus of claim 1, wherein
   the drowsiness determination means determines the drowsiness level as a level higher than the strong drowsiness when the eye opening degree is less than or equal to a third threshold value smaller than the second threshold value, regardless of the other conditions.

4. The drowsiness determination apparatus of claim 1, further comprising
   a position information detection means for detecting position information indicative of positions of an eye and an eyebrow on a facial image shown by an image data, wherein
   the decreased wakefulness detection means specifies an eye opening degree based on the position information, and wherein
   the struggle detection means specifies the distance between an eyebrow and the eye just below the eyebrow based on the position information.

5. The drowsiness determination apparatus of claim 4, wherein
   the drowsiness determination apparatus is mounted on a vehicle; and wherein
   the position information detection means detects the position information indicative of positions of an eye and an eyebrow on a facial image shown by an image data captured by a capturing means mounted on the vehicle.

6. An article of manufacture comprising a computer readable medium and instructions carried on the medium, the instructions forming a computer program that when read and executed cause a computer to perform processes to thereby functioning as the decreased wakefulness detection means, the struggle detection means, and the drowsiness determination means described in claim 1.

* * * * *